(12) United States Patent
Yang et al.

(10) Patent No.: US 9,932,944 B2
(45) Date of Patent: Apr. 3, 2018

(54) SYSTEMS AND METHOD FOR AN INTEGRATED FUEL LEVEL AND PRESSURE SENSOR OF A FUEL TANK

(71) Applicant: Ford Global Technologies, LLC, Dearborn, MI (US)

(72) Inventors: Dennis Seung-Man Yang, Canton, MI (US); Aed M. Dudar, Canton, MI (US); Mohammad R. Aghili, Dearborn, MI (US); Ralph Gesell, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 15/181,135

(22) Filed: Jun. 13, 2016

(65) Prior Publication Data

US 2017/0356408 A1     Dec. 14, 2017

(51) Int. Cl.
| | |
|---|---|
| *G01M 15/00* | (2006.01) |
| *F02M 37/00* | (2006.01) |
| *F02D 41/26* | (2006.01) |
| *G01F 23/30* | (2006.01) |

(52) U.S. Cl.
CPC ......... *F02M 37/0047* (2013.01); *F02D 41/26* (2013.01); *F02M 37/0076* (2013.01); *G01F 23/30* (2013.01)

(58) Field of Classification Search
USPC ............... 73/114.38, 114.43, 114.52, 114.54, 73/290 R, 305, 306, 309, 314, 317, 318, 73/322.5
See application file for complete search history.

(56) References Cited

U.S. PATENT DOCUMENTS

| | | | |
|---|---|---|---|
| 1,798,434 A | 3/1931 | Ruopp | |
| 4,928,657 A * | 5/1990 | Asselin | B60K 15/061 123/497 |
| 5,035,346 A * | 7/1991 | Kalman | B01D 19/0063 137/411 |
| 2003/0189110 A1* | 10/2003 | Kurihara | B60K 15/03519 239/533.2 |
| 2004/0093942 A1* | 5/2004 | Brun | G01F 23/18 73/301 |
| 2007/0272025 A1 | 11/2007 | Casey | |
| 2016/0273473 A1* | 9/2016 | Dudar | B60K 35/00 |

FOREIGN PATENT DOCUMENTS

CN      104897246 A     9/2015

* cited by examiner

*Primary Examiner* — Eric S McCall
(74) *Attorney, Agent, or Firm* — James Dottavio; McCoy Russell LLP

(57) ABSTRACT

Methods and systems are provided for the integration of a fuel level sensor and a fuel pressure sensor in a fuel tank within a fuel system. In one example, an integrated fuel pressure and fuel level sensor for a fuel tank may include a float arm of the fuel sensor coupled to a floating body and a pressure sensor (e.g., a fuel tank pressure transducer) coupled to the floating body, the integrated fuel pressure and fuel level sensor adapted to simultaneously measure fuel level and fuel vapor pressure of the fuel tank.

20 Claims, 10 Drawing Sheets

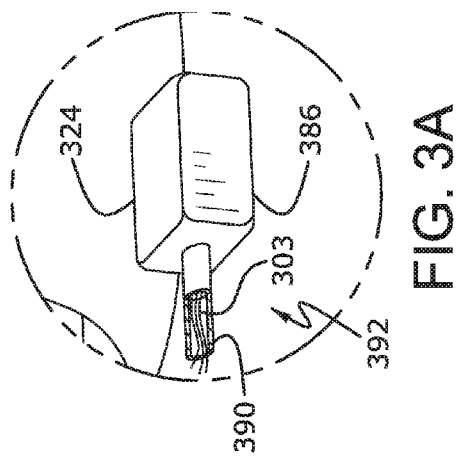
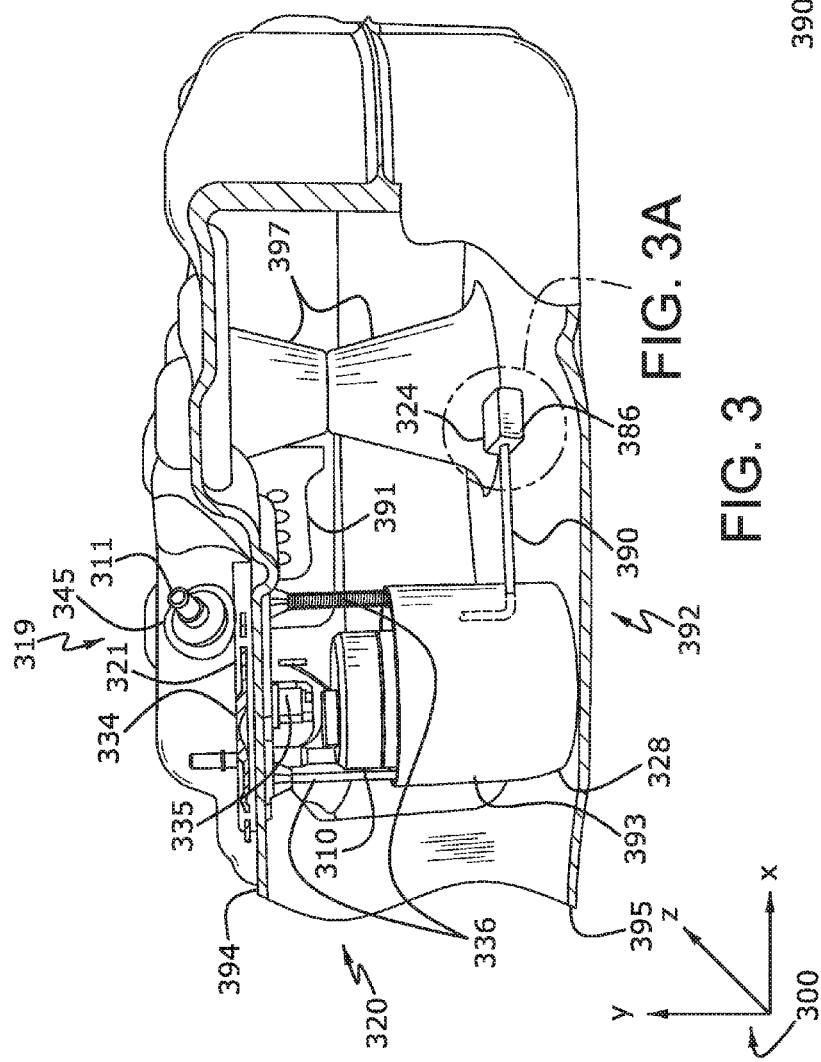

SYSTEMS AND METHOD FOR AN INTEGRATED FUEL LEVEL AND PRESSURE SENSOR OF A FUEL TANK

FIELD

The present description relates generally to methods and systems for a fuel level and fuel pressure sensor of a fuel tank of a vehicle.

BACKGROUND/SUMMARY

Conventional fuel delivery systems for automotive vehicles typically include a fuel tank pressure transducer (FTPT), mounted near a fuel tank, to estimate the vapor pressure within the fuel tank. This vapor pressure estimate is relayed to an electronic engine controller so that the controller can adjust engine operation based on the estimated vapor pressure and/or determine whether a leak has occurred in the fuel tank based on the estimate vapor pressure. In another example, the controller may use the estimated vapor pressure to manage fuel tank pressure, as well as determine when the fuel tank may be purged. Purged vapors from the fuel tank are then vented to the intake manifold of the engine to be consumed therein. Alternatively, the vented vapors may be stored in a carbon canister coupled to the fuel tank. The canister may be part of an evaporative emissions system.

In one example, the FTPT may be positioned on the vapor side (i.e., downstream) of the fuel tank for the purpose of performing a leak diagnostic and vapor detection in the evaporative emissions system. However, the inventors herein have recognized problems with positioning the FTPT external to the fuel tank and downstream of the fuel tank in the evaporative emissions and fuel system. As one example, this positing of the FTPT may result in increased noise of the FTPT output signal. Specifically, as the liquid fuel inside the fuel tank cools and heats up, it becomes the driving function for pressure and vacuum buildup inside the fuel tank. However, the downstream positioning of the FTPT may result in a degraded signal to noise ratio, thereby resulting in a distorted pressure reading and less accurate estimate of the pressure and vacuum buildup due to fuel tank thermal gradients.

As another example, the remote location of the FTPT outside of the fuel tank can lead to exposure of the sensor to external conditions such as dirt or underbody rust. An inline FTPT positioned downstream of the fuel tank (e.g., such as in a vapor tube downstream of the fuel tank) may use extra transducer packing measures to reduce exposure to external conditions. Further, issues may arise when vapor permeates through the connection joints leading to the FTPT in the vapor tube.

Finally, positioning the FTPT outside of the fuel tank may result in reduced efficiency and speed of the sensor response time (e.g., via a transport delay) as vapor pressure changes occur within the fuel tank. However, faster response times may be desired for detecting certain pressure conditions within the fuel tank and taking corrective action based on the detected pressure conditions. For example, in a non-integrated refueling canister only system (NIRCOS), a fuel tank may be depressurized prior to a refueling event. If changes in vapor pressure are not accurately measured with reduced time delay, a fuel door may be opened before the fuel tank pressure has reached a lower threshold level.

Other attempts to address these issues include combining the FTPT with a fuel level indicator located inside of the tank. One example is shown by Gary Lee Casey et. al. US 2007,0272,025. Therein, a fuel tank module control system is configured to measure fuel level and fuel tank vapor pressure through a single sensor.

However, the inventors herein have recognized potential issues with such systems. As one example, a disadvantage of such sensor lies in its dependency on the output of a single sensor within the apparatus. To obtain the fuel level and fuel tank pressure, the sensor alternately measures the pressure of the pressurized vapor as well as the pressure of a fuel column. In the event of a mechanical error (e.g., a sensor malfunction or degradation), both the fuel pressure and fuel level output would be lost and unavailable for adjusting engine operation.

In one example, the issues described above may be addressed by a system for a fuel tank comprising a level sensor positioned inside the fuel tank and including a float arm and a floating body coupled to a first end of the float arm. The system further comprises a pressure sensor integrated with the floating body. As described herein, integrated may refer to the pressure sensor being directly and physically coupled with at least a portion of the level sensor. In this way, both the level and pressure sensors are integrated into one unit within the fuel tank. As a result, response times (due to transport delays) of the pressure sensor may be reduced and the resulting pressure signal may have less noise. Additionally, the packaging space of the two sensors within the fuel tank may be reduced.

As one example, a pivotable float arm of the fuel level sensor utilizes the buoyancy of a floating body to measure the fuel level while an integrated gauge pressor sensor (e.g., FTPT) simultaneously obtains a direct pressure measurement of the vapor pressure within the fuel tank. In one example, the pressure sensor may be positioned at a top surface of the float with an atmospheric reference port of the sensor positioned underneath the sensing port (e.g., portion) of the pressure sensor. Further, an electrical connection of the pressure sensor may be routed through an interior of the float arm. As a result, the pressure sensor electrical connections may be isolated from the fluid within the tank. Additionally, the electrical connections of both the level sensor and pressure sensor may be electrically connected to a common control unit of a fuel delivery module within the fuel tank. This may reduce electrical connections within the tank and provide for a common electrical connection outlet from the fuel delivery module and to the engine controller.

The positioning of the pressure sensor within the fuel tank and on a floating body of the level sensor results in a pressure sensor output with reduced noise and faster response time (due to reduced transport delay). Additionally, the exposure to external conditions that may result in sensor degradation may be reduced since the pressure sensor is positioned within the sealed fuel tank. Further, integration of the pressure sensor within the fuel level sensor float simplifies packaging.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows an internal view of an example embodiment of an integrated fuel tank pressure transducer and fuel level sensor within a fuel delivery module of a fuel system.

FIG. 3A shows an exploded view of the integrated fuel tank pressure transducer and fuel level sensor of FIG. 3.

DETAILED DESCRIPTION

Figure 1:
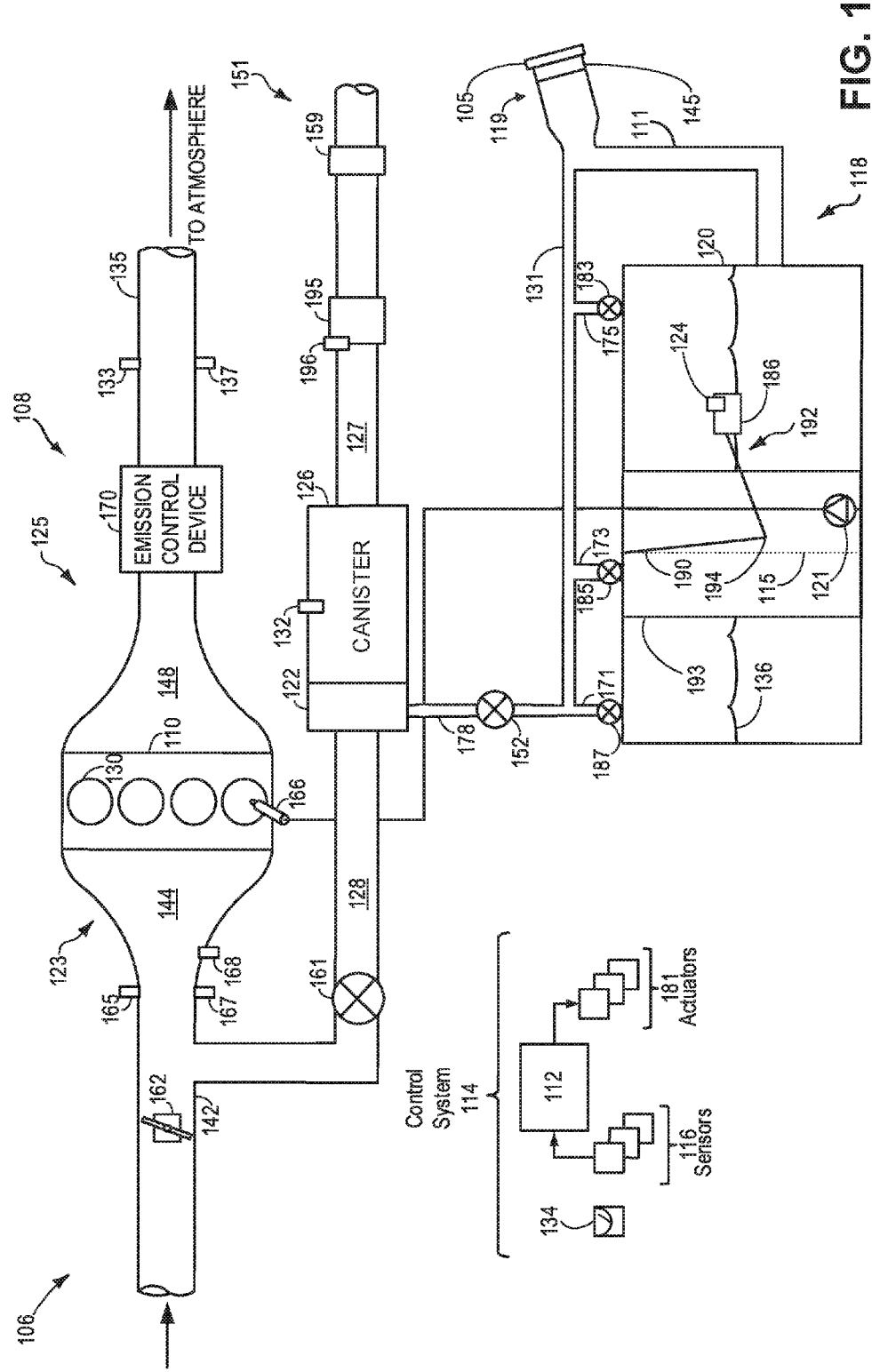
FIG. 1 shows a schematic depiction of a vehicle system comprising an engine system coupled to a fuel system and an evaporative emissions system.
Figure 2:
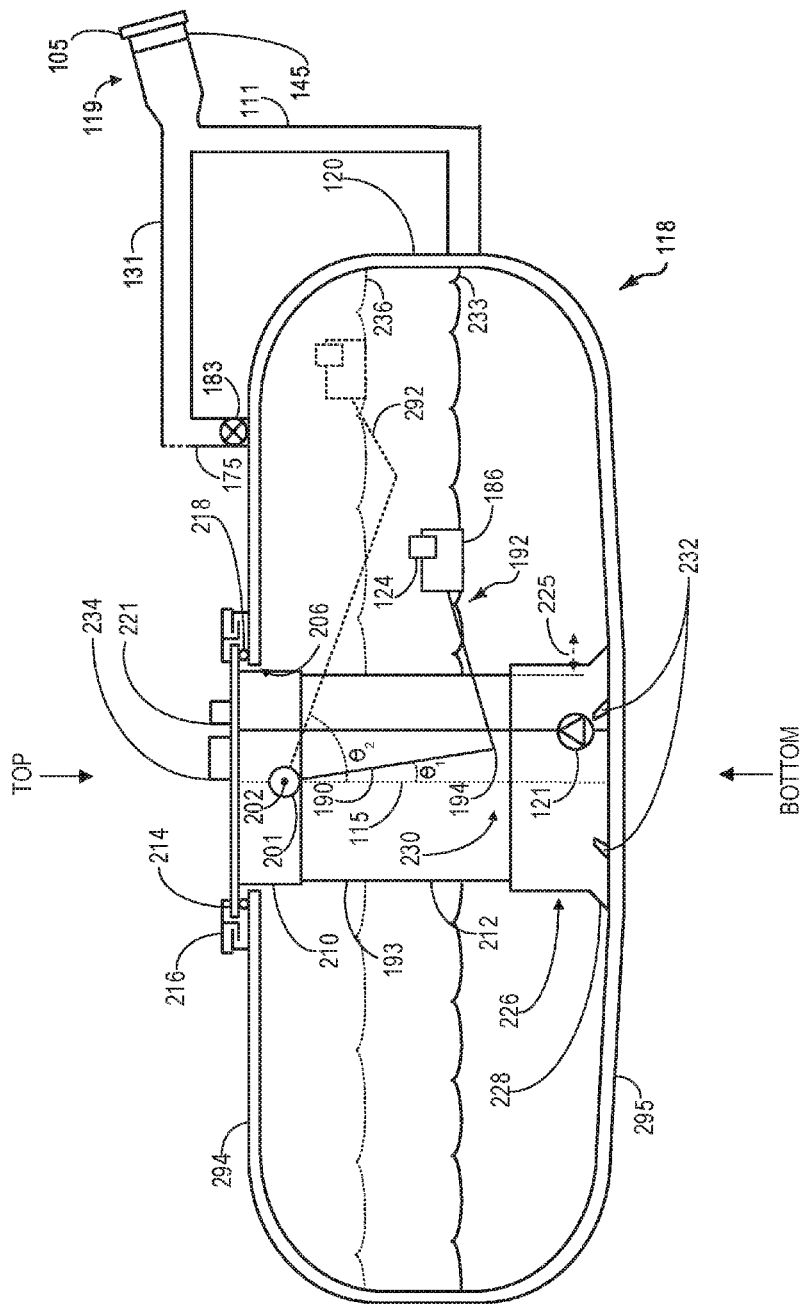
FIG. 2 shows a schematic depiction of a fuel tank including an integrated fuel tank pressure transducer and fuel level sensor within a fuel delivery module of a fuel system.
Figure 4:
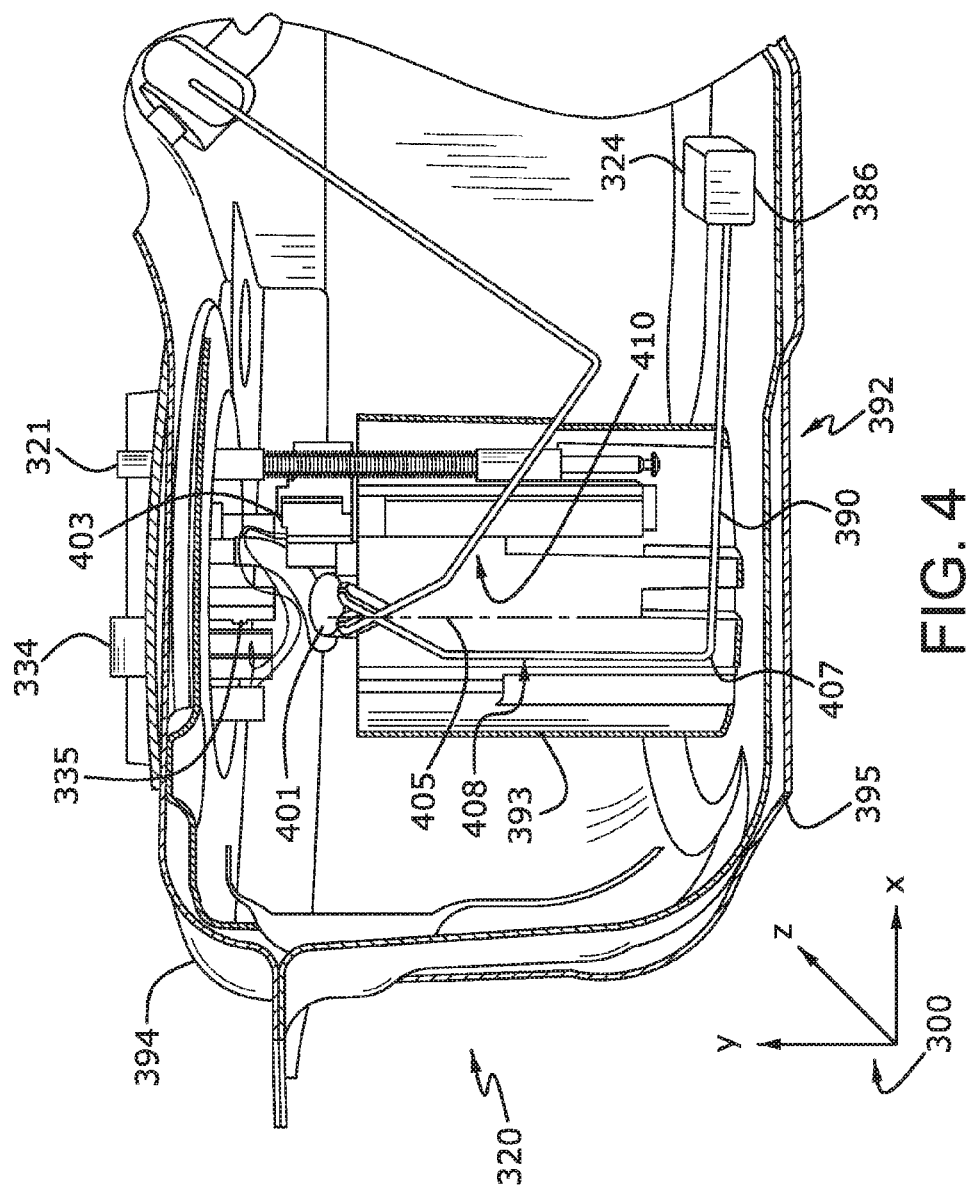
FIG. 4 shows a cross-sectional view of the fuel delivery module of FIG. 3.
Figure 5:
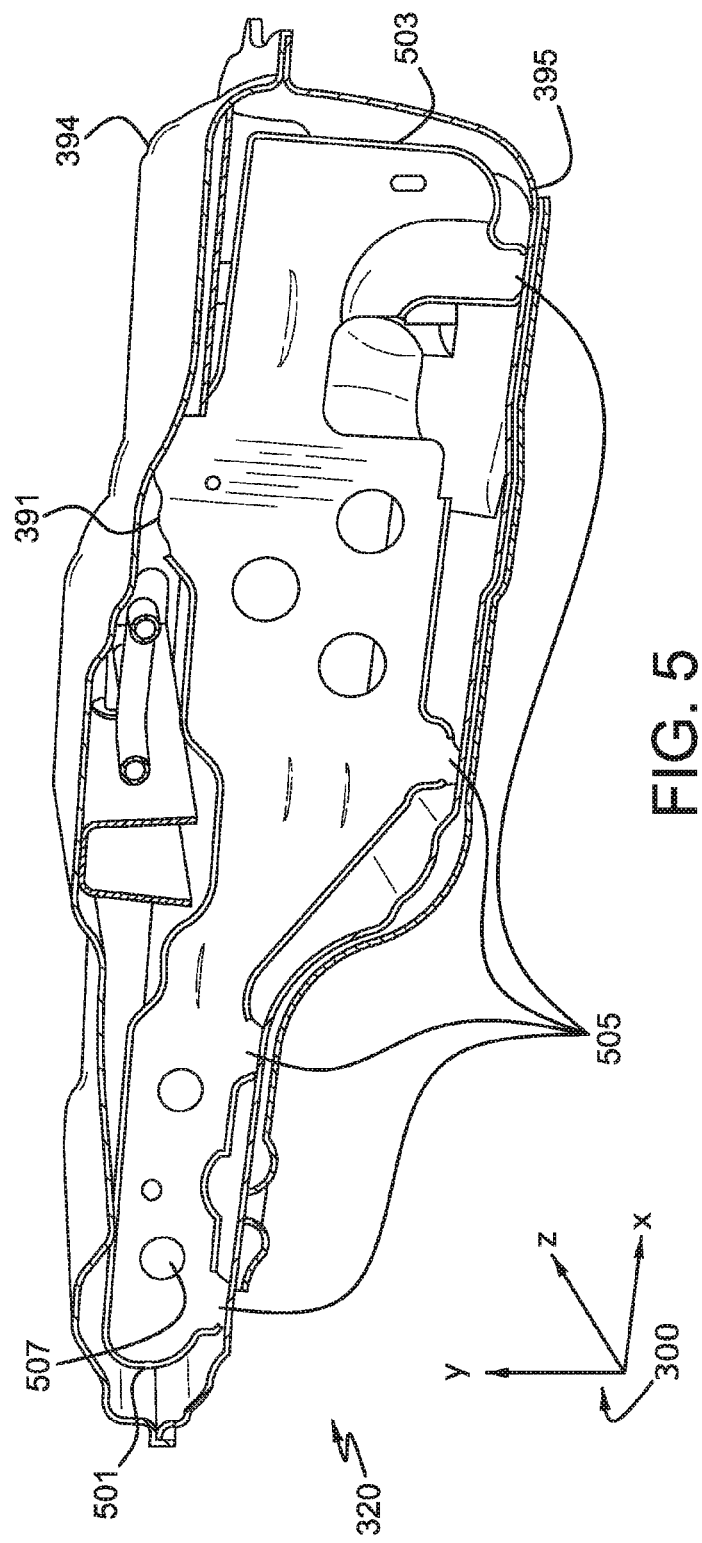
FIG. 5 shows an internal view of an example embodiment of a fuel tank within a fuel system.
Figure 6:
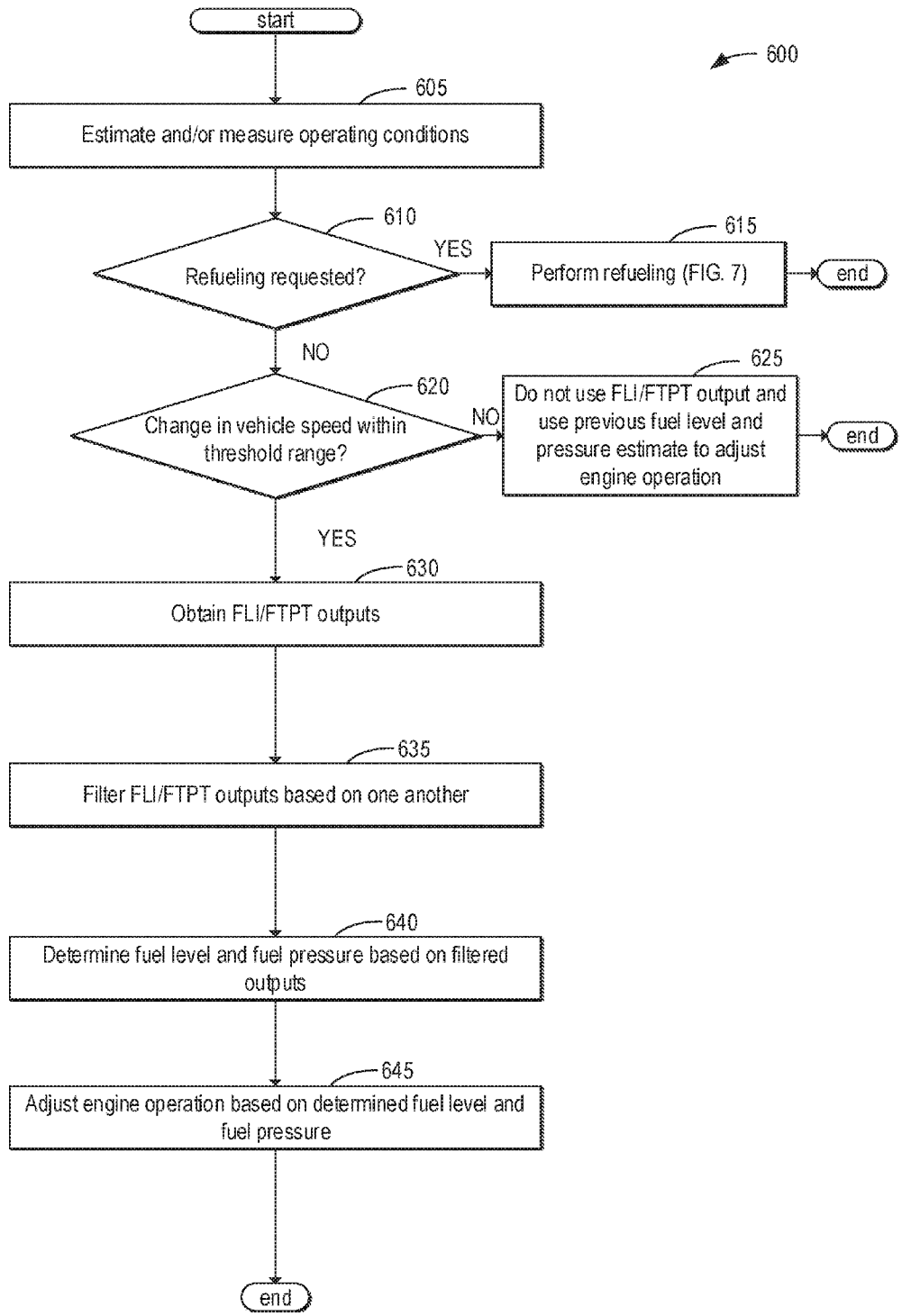
FIG. 6 shows an example method for controlling an engine based on outputs of an integrated fuel level and pressure sensor inside of a fuel tank.
Figure 10:
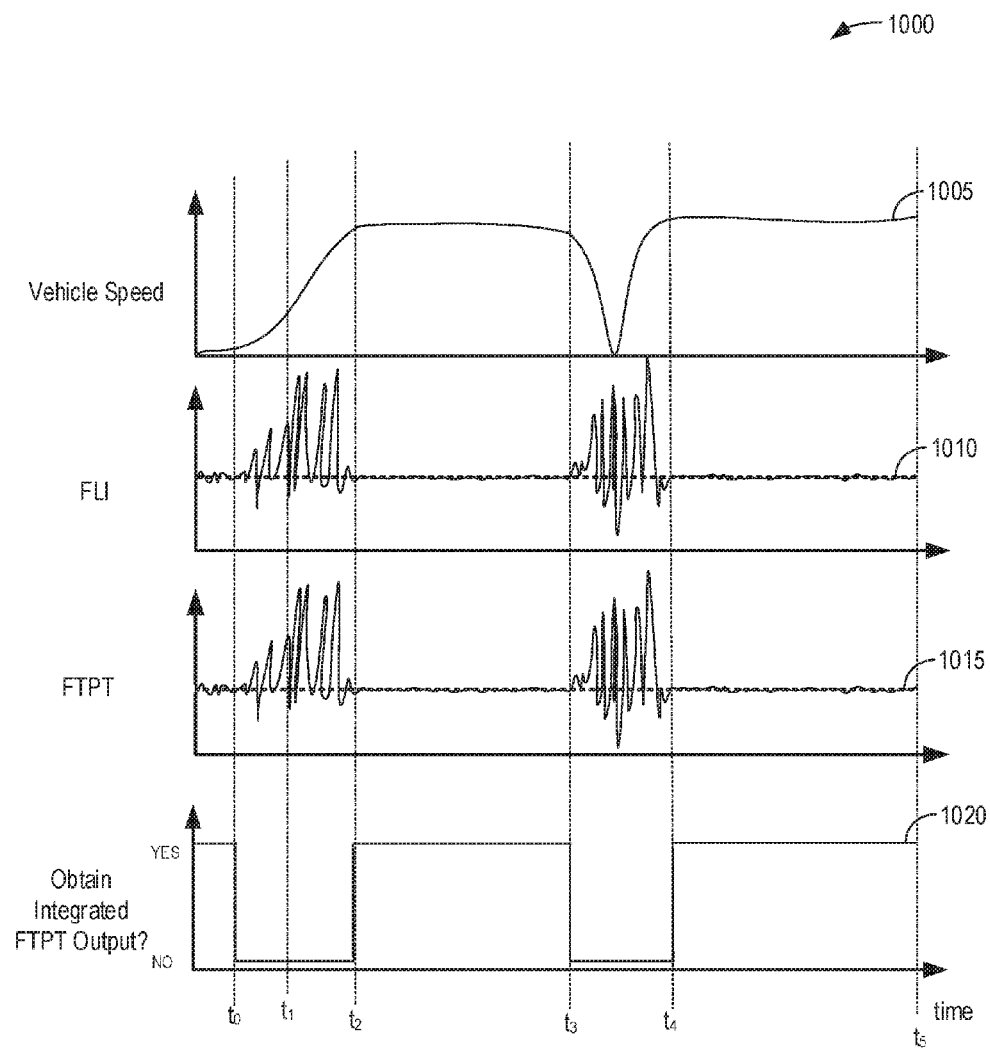
FIG. 10 shows an example graph showing changes in outputs of a fuel level sensor and pressure sensor integrated with the fuel level sensor as a speed of a vehicle changes.

The following detailed description relates to systems and methods for a fuel vapor pressure sensor integrated with a fuel fill level sensor inside of a fuel tank within a fuel system, such as the fuel system shown in FIG. 1. The fuel tank may be included in a vehicle, such as a hybrid electric vehicle. The vehicle may include a fuel system and an evaporative emissions (evap) system, wherein the fuel tank is coupled to a fuel vapor canister via one or more fuel vapor recovery lines, as shown in FIG. 1. The fuel tank may include a fuel delivery module wherein the fuel delivery module includes an integrated fuel tank pressure transducer and fuel level sensor, as shown in FIG. 2. The integrated fuel tank pressure transducer and fuel level sensor may include a fuel level sensor comprised of a pivotable float arm and floating body. The fuel tank pressure transducer may be a gauge pressure sensor directly coupled to and integrated within the floating body of the fuel level sensor, as shown in FIGS. 3-4. As also shown in FIG. 4, both the fuel level sensor and fuel tank pressure transducer may be electrically coupled to a common control unit of the fuel delivery module. The fuel delivery module may then have a single electrical connection (e.g., electrical outlet port) that is electrically coupled to an electronic controller of the engine for sending fuel level and pressure signals to the controller. An example embodiment of a fuel tank may include baffles for reduction of fuel slosh, as shown in FIG. 5. FIG. 6 depicts an example method for controlling a vehicle engine based on outputs of the integrated fuel level and fuel tank pressure transducer. For example, outputs of the fuel level sensor and fuel tank pressure transducer may be filtered based on one another and then the filtered outputs may be used to estimate a fuel level and fuel pressure within the fuel tank. The engine controller may then adjust engine operation based on the estimate fuel level and fuel pressure. As shown in FIG. 10, under certain conditions, such as when the output of the fuel level sensor is changing by more than a threshold (e.g., such that the output may be oscillating), the output from the fuel tank pressure transducer may not be used to adjust engine operation.

Figure 7:
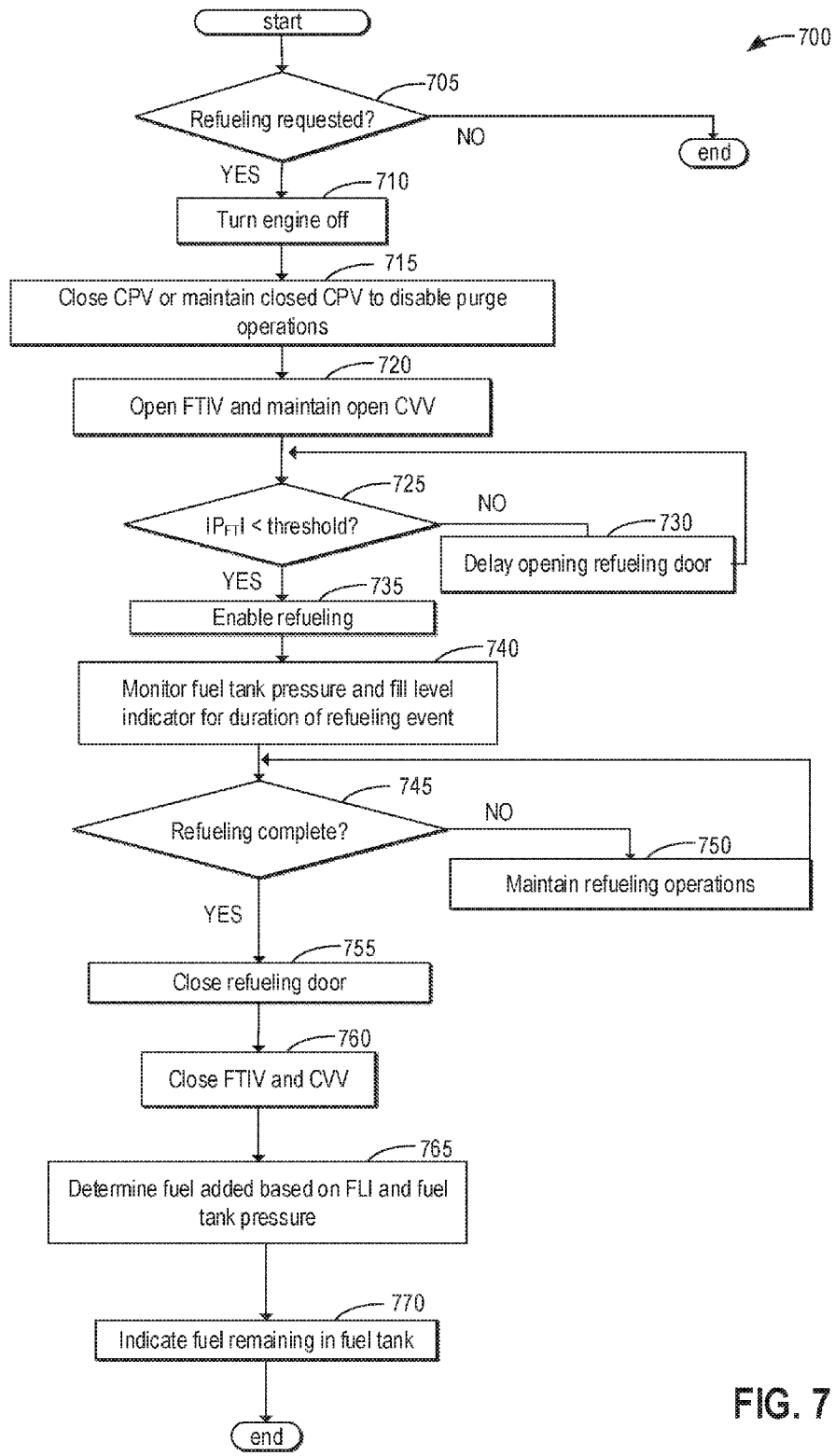
FIG. 7 shows an example method for refueling a vehicle based on a request from the engine operator and outputs of an integrated fuel level and pressure sensor of a fuel tank.

During a refueling event, as depicted in the example method of FIG. 7, the controller may determine an amount of fuel added to the fuel tank based on outputs of the fuel level sensor and the fuel tank pressure transducer. As shown in the graphs presented in FIGS. 8-9, the fuel tank pressure transducer may experience a sudden increase (e.g., spike or peak) in pressure, thereby indicating an end of the refueling event. As a result, refueling may end and the fuel level of the fuel tank may be updated based on a change in output of the fuel level sensor. In this way, a fuel tank pressure transducer integrated with a fuel level sensor within a fuel tank may result in more accurate and faster responding pressure output. As a result, engine control based on the fuel tank pressure may be more efficient and accurate.

FIG. 1 shows a schematic depiction of a vehicle system 106. The vehicle system 106 includes an engine system 108 coupled to an emissions control system 151 and a fuel system 118. Emission control system 151 includes a fuel vapor container or canister 126 which may be used to capture and store fuel vapors. In some examples, vehicle system 106 may be a hybrid electric vehicle system.

The engine system 108 may include an engine 110 having a plurality of cylinders 130. The engine 110 includes an engine intake 123 and an engine exhaust 125. The engine intake 123 includes a throttle 162 fluidly coupled to the engine intake manifold 144 via an intake passage 142. The engine exhaust 125 includes an exhaust manifold 148 leading to an exhaust passage 135 that routes exhaust gas to the atmosphere. The engine exhaust 125 may include one or more emission control devices 170, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, a manifold adjusted pressure (MAP) sensor 165, an intake air temperature (IAT) sensor 167, and/or a manifold air flow (MAF) sensor 168 may be coupled to engine intake 123, while exhaust temperature sensor 133 and exhaust gas oxygen sensor 137 may be coupled to engine exhaust 125.

Fuel system 118 may include a fuel tank 120 containing a fuel delivery module 193 (herein referred to as FDM 193). The FDM 193 is an integrated system that combines various fuel system components into a single unit. For example, FDM 193 may include a fuel pump, a fuel reservoir, a fuel indicator assembly, and/or various other fuel system components or sensors. Example fuel delivery module components are described in more detail below and in reference to FIGS. 2-3. As shown in FIG. 1, the FDM 193 is coupled to a fuel pump system 121. The fuel pump system 121 may include one or more pumps for pressurizing fuel delivered to the fuel injectors of engine 110, such as the example fuel injector 166 shown. While only a single injector 166 is shown, additional injectors are provided for each cylinder. It will be appreciated that fuel system 118 may be a return-less fuel system, a return fuel system, or various other types of fuel system. Fuel tank 120 may hold a plurality of fuel blends, including fuel with a range of alcohol concentrations, such as various gasoline-ethanol blends, including E10, E85, gasoline, etc., and combinations thereof.

Located in fuel tank 120, an integrated (e.g., combined) FTPT and fuel level indicator (e.g., sensor) unit 192 (herein referred to as FTPT unit 192) may provide an indication of both the fuel level ("Fuel Level Indication" or "FLI") and fuel tank vapor pressure to controller (e.g., engine controller) 112. In this way, the FTPT unit 192 may include both a fuel level sensor and pressure sensor integrated (e.g., combined) as one unit that is physically and electrically coupled with the FDM 193.

As depicted, FTPT unit 192 may include a float arm 190 and a floating body 186. Specifically, floating body 186 is directly coupled to an end (e.g., end exterior to FDM 193) of the float arm 190. Together, an angular position of float arm 190 and floating body 186 provide an indication of fuel level (e.g., "FLI") within fuel tank 120. Float arm 190 may pivot about a pivot point (e.g., pivotable base) aligned along a longitudinal axis 115. The float arm 190 is coupled between the pivotable base, which is a variable resistor connected as part of FDM 193, and the floating body 186. Float arm 190 bends at a right angle to form a float arm elbow 194. As the floating body 186 moves up or down relative to the fuel level 136 the float arm moves away from or toward the longitudinal axis 115. This results in a change in resistance measurement of the pivotable base. This resistance measurement is then used to determine a fuel level within the fuel tank 120.

Downstream of elbow 194, a first end of float arm 190 is directly connected to floating body 186. A fuel tank pressure transducer (FTPT) 124 is directly coupled to the top of floating body 186. In one example, FTPT 124 may be a gauge pressure sensor. Fuel tank vapor pressure may be determined based on an output of FTPT 124. The FTPT 124 includes a sensing portion positioned at a top surface of floating body 186 and a reference portion positioned underneath the sensing portion. An electrical connection is coupled to the sensing portion of FTPT 124 and routed through an interior (e.g., interior cavity not exposed to fuel within the fuel tank) of the float arm 190. Further details regarding FTPT unit 192 may be found below in the descriptions of FIGS. 2-4.

Vapors generated in fuel system 118 may be routed to an evaporative emissions control system 151 which includes fuel vapor canister 126 via vapor recovery line 131, before being purged to the engine intake 123. Vapor recovery line 131 may be coupled to fuel tank 120 via one or more conduits and may include one or more valves for isolating the fuel tank during certain conditions. For example, vapor recovery line 131 may be coupled to fuel tank 120 via one or more or a combination of conduits 171, 173, and 175.

Further, in some examples, one or more fuel tank vent valves are provided in conduits 171, 173, or 175. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 171 may include a grade vent valve (GVV) 187, conduit 173 may include a grade vent valve (GVV) 185, and conduit 175 may include a fuel tank vent valve (FTVV) 183. The one or more vent valves may be electronically or mechanically actuated valves and may include active vent valves (that is, valves with moving parts that are actuated open or close by a controller, such as controller 112) or passive valves (that is, valves with no moving parts that are actuated open or close passively based on a tank fill level). Based on a fuel level in the fuel tank 120, the vent valves may be open or closed. For example, GVV 187 may be normally open allowing for diurnal and "running loss" vapors from the fuel tank to be released into canister 126, preventing over-pressurizing of the fuel tank. However, during vehicle operation on an incline, when a fuel level indicated by the fuel level sensor (float arm 190, floating body 186, and the pivotable base) is artificially raised on one side of the fuel tank, GVV 187 may close to prevent liquid fuel from entering vapor recovery line 131. As another example, FTVV 183 may be normally open, however during fuel tank refilling, FTVV 183 may close, causing pressure to build in vapor recovery line 131 as well as at a filler nozzle coupled to the fuel pump. The increase in pressure at the filler nozzle may then trip the refueling pump, stopping the fuel fill process automatically, and preventing overfilling.

Further, in some examples, vapor recovery line 131 may be coupled to a refueling system 119. In some examples, refueling system 119 may include a fuel cap 105 for sealing off the fuel filler system from the atmosphere. Refueling system 119 is coupled to fuel tank 120 via a fuel filler pipe or neck 111. Further, refueling system 119 may include refueling lock 145. In some embodiments, refueling lock 145 may be a fuel cap locking mechanism. The fuel cap locking mechanism may be configured to automatically lock the fuel cap in a closed position so that the fuel cap cannot be opened. For example, the fuel cap 105 may remain locked via refueling lock 145 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 145 may be a filler pipe valve located at a mouth of fuel filler pipe 111. In such embodiments, refueling lock 145 may not prevent the removal of fuel cap 105. Rather, refueling lock 145 may prevent the insertion of a refueling pump into fuel filler pipe 111. The filler pipe valve may be electrically locked, for example by a solenoid, or mechanically locked, for example by a pressure diaphragm.

In some embodiments, refueling lock 145 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 145 is locked using an electrical mechanism, refueling lock 145 may be unlocked by commands from controller 112, for example, when a fuel tank pressure decreases below a pressure threshold. In embodiments where refueling lock 145 is locked using a mechanical mechanism, refueling lock 145 may be unlocked via a pressure gradient, for example, when a fuel tank pressure decreases to atmospheric pressure.

Emissions control system 151 may include one or more emissions control devices, such as one or more fuel vapor canisters 126 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 151 may further include a canister ventilation path or vent line 127 which may route gases out of the canister 126 to the atmosphere when storing, or trapping, fuel vapors from fuel system 118.

Canister 126 may include a buffer 122 (or buffer region), each of the canister and the buffer comprising the adsorbent. As shown, the volume of buffer 122 may be smaller than (e.g., a fraction of) the volume of canister 126. The adsorbent in the buffer 122 may be same as, or different from, the adsorbent in the canister (e.g., both may include charcoal). Buffer 122 may be positioned within canister 126 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

One or more temperature sensors 132 may be coupled to and/or within canister 126. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 127 may also allow fresh air to be drawn into canister 126 when purging stored fuel vapors from fuel system 118 to engine intake 123 via purge line 128 and canister purge valve (CPV) 161. For example, CPV 161 may be normally closed but may be opened during certain conditions so that vacuum from engine intake manifold 144 is provided to the fuel vapor canister for purging. In some examples, vent line 127 may include an air filter 159 disposed therein upstream of a canister 126.

Flow of air and vapors between canister 126 and the atmosphere may be regulated by a canister vent valve (CVV) (not shown) which may be a normally open valve, so that fuel tank isolation valve 152 (FTIV) may control venting of fuel tank 120 with the atmosphere. FTIV 152 may be positioned between the fuel tank and the fuel vapor canister within conduit 178. FTIV 152 may be a normally closed valve, that when opened, allows for the venting of fuel vapors from fuel tank 120 to canister 126. Fuel vapors may then be vented to atmosphere via canister vent valve, or purged to engine intake system 123 via canister purge valve 161.

Fuel system 118 may be operated by controller 112 in a plurality of modes by selective adjustment of the various valves and solenoids described herein. For example, the fuel system may be operated in a fuel vapor storage mode (e.g., during a fuel tank refueling operation and with the engine not running), wherein the controller 112 may open FTIV 152 while closing CPV 161 to direct refueling vapors into canister 126 while preventing fuel vapors from being directed into the intake manifold.

As another example, the fuel system may be operated in a refueling mode (e.g., when fuel tank refueling is requested by a vehicle operator), wherein the controller 112 may open FTIV 152 while maintaining CPV 161 closed, to depressurize the fuel tank before allowing fuel to be added therein. As such, FTIV 152 may be kept open during the refueling operation to allow refueling vapors to be stored in the canister. After refueling is completed, the FTIV 152 may be closed.

As yet another example, the fuel system may be operated in a canister purging mode (e.g., after an emission control device light-off temperature has been attained and with the engine running), wherein the controller 112 may open CPV 161 while closing FTIV 152. Herein, the vacuum generated by the intake manifold of the operating engine may be used to draw fresh air through vent 127 and through fuel vapor canister 126 to purge the stored fuel vapors into intake manifold 144. In this mode, the purged fuel vapors from the canister are combusted in the engine. The purging may be continued until the stored fuel vapor amount in the canister is below a threshold.

Controller 112 may comprise a portion of a control system 114. Control system 114 is shown receiving information from a plurality of sensors 116 (various examples of which are described herein) and sending control signals to a plurality of actuators 181 (various examples of which are described herein). As one example, sensors 116 may include exhaust gas oxygen sensor 137 located upstream of the emission control device, temperature sensor 133, fuel tank pressure sensor 124, FTPT unit 192, MAP sensor 165, intake air temperature sensor 167, and canister temperature sensor 132. Other sensors such as pressure, temperature, air/fuel ratio, and composition sensors may be coupled to various locations in the vehicle system 106. As another example, the actuators may include fuel injector 166, throttle 162, FTIV 152, ELCM 195, fuel pump system 121, and refueling lock 145. The control system 114 may include a controller 112. The controller may receive input data from the various sensors, process the input data, and trigger the actuators in response to the processed input data based on instruction or code programmed therein corresponding to one or more routines. Examples of the sensors that send data to controller 112 and actuators triggered by controller 112 are discussed in greater detail herein with regard to FIG. 1.

Undesired evaporative emission detection routines may be intermittently performed by controller 112 on fuel system 118 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by an evaporative leak check module (ELCM) 195 communicatively coupled to controller 112. ELCM 195 may be coupled in vent 127, between canister 126 and the atmosphere. ELCM 195 may include a vacuum pump configured to apply a negative pressure to the fuel system when in a first conformation, such as when administering a leak test. ELCM 195 may further include a reference orifice and a pressure sensor 196. Following the applying of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation.

The controller 112 receives signals from the various sensors of FIG. 1 and employs the various actuators of FIG. 1 to adjust engine operation based on the received signals and instructions stored on a memory of the controller. For example, indicating a fuel tank pressure in a fuel tank based on received signals from an electronic unit of the FDM (which may indicate a fuel level and pressure within the fuel tank), includes sending a signal to a fuel level display 134 of the vehicle to adjust a visual indication of the fuel level (which is displayed to a vehicle operator). More specifically, the controller 112 receives information from a plurality of sensors 116. For example, sensors 116 may include sensors located upstream of the emission control device such as an exhaust gas oxygen sensor 137 to sense oxygen levels of the exhaust gas flowing to the atmosphere and a temperature sensor 133 to sense the temperature of the exhaust gas flowing to the atmosphere. As another example, sensors 116 may include a sensor located on a floating body of a FTPT unit 192, such as a fuel tank gauge pressure sensor 124, that may sense the pressure of the fuel vapor within a fuel tank. As yet another example, sensors 116 may include a fuel level sensor, located on a FTPT unit 192, to sense a level of fuel within a fuel tank. As yet another example, sensors 116 may include a manifold absolute pressure (MAP) sensor 165—to sense the absolute pressure of the engine intake manifold-, intake air temperature (IAT) sensor 167—to sense the air temperature of the engine intake manifold-, and/or a manifold air flow (MAF) sensor 168—to sense the air flow of the engine intake manifold-, with these aforementioned sensors located in the intake passage of the engine intake manifold. Continuing with another example, sensors 116 may include an evaporative leak check module (ELCM) pressure sensor 196, located in the canister vent line, to sense the pressure in the canister vent line. Continuing with another example, sensors 116 may include a canister temperature sensor 132, located in the fuel vapor canister, to sense the temperature of the fuel vapor canister.

The controller 112 employs various actuators of FIG. 1 to adjust engine operation based on the received signals—such as those examples given above- and instructions stored on a memory of the controller. For example, adjusting the injection of fuel may include adjusting an actuator of a fuel injector 166 to adjust fuel injection. As another example, adjusting an air flow through an intake passage of an engine intake manifold may include adjusting an actuator of a throttle 162 to adjust the air flow. As another example, adjusting a venting of a fuel tank with the atmosphere may include adjusting an actuator of a fuel tank isolation valve (FTIV) 152 to adjust the venting of the fuel tank. As yet another example, adjusting evaporative emissions tests may include adjusting an actuator of ELCM 195 to adjust evaporative emissions tests. As yet another example, adjusting fuel pumped through a fuel system may include adjusting an actuator of a fuel pump 121 to adjust the fuel pumped through a fuel system. Continuing with another example, adjusting a fuel cap locking mechanism may include adjusting an actuator of a refueling lock 145 to adjust the fuel cap locking mechanism. Continuing with another example, adjusting a venting of a fuel tank may include adjusting actuators of a grade vent valve (GVV) 187, a grade vent valve (GVV) 185, and a fuel tank vent valve (FTVV) 183 to adjust the venting of a fuel tank. As yet another example, adjusting a flow of vapors purged through a purge line 128 may include adjusting an actuator of a canister purge valve 161 to adjust the flow of vapors purged through a purge line. As yet another example, adjusting a flow of fuel vapors vented to the atmosphere may include adjusting an actuator of a canister vent valve (CVV) to adjust the flow of fuel vapors vented to the atmosphere.

Turning now to FIG. 2, a more detailed embodiment of the FDM 193 is shown in an installed position in fuel tank 120. For simplicity, the numbers for the components from FIG. 1 have remained the same. FIG. 2 also shows a schematic depiction of the integrated fuel tank pressure transducer and fuel level sensor (e.g., FTPT unit) 192 within the FDM 193.

FDM 193 may be installed within tank 120 through an aperture 206 in an upper wall 294 of the fuel tank and coupled to a lower wall 295 of the fuel tank in a region of the lower wall directly opposing the aperture in the upper wall. In the installed position, a longitudinal axis (which, in one example, may be a central axis) 115 of FDM 193 may be substantially perpendicular to the lower wall 295 in the region of the lower wall 295 where the fuel delivery module is coupled. In some examples, FDM 193 may also be coupled to the upper wall 294 with one or more mechanical couplings. In some examples, FDM 193 may be coupled to the upper or lower walls by a suitable welding technique.

FDM 193 may have a variety of shapes which are sufficiently rigid to provide structural support to the upper and lower walls of the fuel tank when coupled thereto. In some examples, the supportive fuel delivery module may be substantially cylindrically shaped around longitudinal axis 115.

FDM 193 includes a fuel delivery module top cap 210 (FDM top cap 210) coupled between a fuel delivery module body 212 (FDM body 212) and an exterior lip or flange 214 of the fuel tank 120. The FDM top cap 210 may be coupled to FDM body 212 by a variety of methods. For example, FDM top cap 210 may be mechanically coupled to FDM body 212, e.g., via threads, screws, or the like.

The exterior flange 214 is configured to overlap a region of the upper wall 294 adjacent to a perimeter of the aperture 206. In this way, when the FDM 193 is installed in the fuel tank 120, the flange 214 may assist in sealing of the aperture. The FDM top cap 210 may include or be integrated with a locking ring 216. The FDM top cap 210 and locking ring 216 may be installed in an orientation to create a sufficient amount of pressure on the sealing member to hermetically seal the gap between the flange 214 and the upper wall 294.

A sealing member 218, e.g., an o-ring or the like, is shown disposed in an overlap region between the flange 214 of the FDM top cap 210 and region 294 of the upper wall of a fuel tank adjacent to a perimeter of an aperture in the upper wall of said fuel tank. The sealing member may extend around the entire circumference of the FDM top cap beneath flange 214 and may be composed of a compressible material, e.g., silicone, or the like.

When the locking ring 216 is installed, e.g., as described above, the locking ring may compress sealing member 218 between flange 214 and the upper wall of the fuel tank. The amount of compression conferred by the locking ring onto the sealing member may be sufficient to substantially seal the aperture in the upper wall of the fuel tank when the fuel delivery module is in an installed configuration.

The FDM top cap 210 may include fuel system components coupled thereto. Examples of such components include a fuel outlet 221 and an electrical outlet port 234. Fuel pump 121 is fluidly coupled to fuel outlet 221 via a fuel passage within FDM 193 to flow fuel from FDM 193 through fuel outlet 221 into a fuel passage coupled to a variable number of fuel injectors (e.g., fuel injector 166) of the engine 110. Fuel pump 121 is electrically coupled to a FDM electronic unit (not shown in FIG. 2). The FDM electronic unit is electrically connected to the electrical outlet port 234 to enable electrical communication between the FDM electronic unit and the engine controller (e.g., controller 112 shown in FIG. 1). For example, the electrical outlet port 234 may be electrically coupled to the engine controller and communicate signals (such as signals from the sensors of the FDM) to the engine controller. The electrical outlet port may also allow the FDM electronic unit to receive electrical signals (e.g., such as control signals for controlling the fuel pump 121) from the engine controller. The specific features of the FDM electronic unit are discussed in greater detail herein with regard to FIG. 3.

As described above, the FDM top cap 210 may be coupled to the FDM body 212. The FDM body 212 defines an interior cavity of the FDM 193. The FDM body 212 may be substantially hollow so that various fuel system components may be included therein. Further, the FDM body 212 may be substantially rigid to provide structural support to the upper and lower walls of the fuel tank 120 when coupled thereto.

The FDM body 212 may include a reservoir or cup configured to retain a quantity of fuel for delivery to an engine. The reservoir may be configured to maintain a substantially constant source of fuel for fuel pump 121 within the fuel delivery system in the FDM 193. Thus, the reservoir may be continuously replenished with fuel by routing a portion of pressurized fuel to a jet pump, e.g., a jet pump mounted within the reservoir, to entrain fuel from the fuel tank to the reservoir or by routing return fuel to the reservoir, or a combination of the two. In some examples, fuel may be pressurized in the reservoir (e.g., to reduce vaporization of the fuel therein).

A base portion of FDM body 212 may be coupled to the lower wall 295 of the fuel tank by a variety of methods. In some examples, the lower wall 295 of fuel tank 120 may include an FDM retainer 226 coupled thereto and configured to couple with a base portion of the FDM body. For example, FDM retainer 226 may be configured to lockably receive a base portion of the FDM body.

As shown in FIG. 2, a FDM retainer 226 may comprise a weld pad 228 and a main cylinder 230. The weld pad may be coupled to the lower wall 295 of the fuel tank in a region of the lower wall directly opposing aperture 206 in upper wall 294. Weld pad 228 may be integrally molded with, welded to, and/or mechanically coupled to the lower wall of the fuel tank.

A plurality of openings 232 may be included at a base portion of the retainer, e.g., in the weld pad of the retainer, for receiving fuel from the fuel tank. In some examples, the FDM retainer may be comprised of a plurality of separate standing pieces to allow fuel to flow into the fuel delivery module. The fuel flowing into the fuel delivery module via openings 232 may be pumped into a reservoir for subsequent delivery to an engine, for example.

In FIG. 2, the FTPT unit 192 is shown coupled to the FDM top cap 210 of FDM 193. The FTPT unit 192 may be configured to sense a fuel level in the fuel tank (e.g., "FLI") as well as the vapor pressure inside the fuel tank (e.g., via a FTPT 124). As described in FIG. 1, the FTPT unit 192 may include a pivotal float arm 190—containing float arm elbow 194- and a floating body 186. The float arm 190 is pivotable about a pivot point 202 via a pivotable base 201. Together, the float arm 190, pivotable base 201, and floating body 186 sense a fuel level in the fuel tank. For example, as a fuel level in the fuel tank increases from a first level 233 to a second level 236, the floating body 186 may rise with the increasing fuel level causing the float arm 190 and pivotable base to pivot further outward and away from longitudinal axis 115, as shown at 292. For example, as shown in FIG. 2, the float arm 190 moves from a first angle, $\theta_1$, when at the first level 233 to a larger, second angle, $\theta_2$, at the second level 236. The first and second angles are the angle of the float arm 190 relative to the longitudinal axis 115. The change in angle registers as a change in resistance of the pivotable base 201 which the float arm 190 is rigidly attached to. This resistance may be read by the FDM control unit and sent to the engine controller where the fuel level may be determined based on the measured resistance (where the resistance is directly related to the angle between the float arm and the longitudinal axis). Further detail describing the pivotable base may be found below in the description of FIG. 4.

In some examples, the FTPT unit 192 may extend a distance beyond a wall of FDM retainer 226. For example, a region of the FTPT unit 192 which overlaps the retainer when the fuel delivery module is installed therein, e.g., a region of the FTPT unit 192 adjacent to and including the floating body 186, may be positioned an example threshold distance 225 from the FDM body 212, where the threshold distance 225 is sufficiently large so that the range of motion of the FTPT unit 192 is not reduced by the FDM retainer when the fuel delivery module is installed therein. In this example, the threshold distance 225 may depend on the range of motion, e.g., degrees of freedom, of the FTPT unit 192 within the fuel tank.

Turning now to FIGS. 3-5, these figures show an example embodiment of a fuel tank 320 configured to be installed within a fuel system, such as the fuel system 118 including fuel tank 120 depicted in FIGS. 1 and 2. Further, FIGS. 3-4 show an example embodiment of a FDM 393 installed within fuel tank 320. FDM 393 may include similar components and function similarly to FDM 193 described above with reference to FIGS. 1-2. FIG. 3 shows an internal side view of the fuel tank 320 with FDM 393 housing a FTPT unit 392. FIG. 4 shows a cross-sectional view of the fuel tank 320 and FDM 393 and exposes an interior of FDM 393 which houses FTPT unit 392. FIG. 5 shows a full length, side view of an interior body of fuel tank 320. FIGS. 3-5 show an axes system 300 including a horizontal, x-axis, a longitudinal, y-axis, and a lateral, z-axis.

As shown in FIG. 3, the interior of fuel tank 320 may act to hold a fuel delivery module such as a FDM 393. FDM 393 is coupled between a top (e.g., top wall) 394 and a base (e.g., base or bottom wall) 395 of the fuel tank 320 via FDM structural support beams 336 and a FDM base 328 (e.g., via welding). Structural support beams 336 may be cylindrical in shape with each beam located on an opposite end of a FDM top cap 310 to flank FDM 393. Top cap 310 contains electrical outlet port 334 and fuel outlet port 321 (similar to electrical outlet port 234 and fuel outlet port 221 of FIG. 2). Electrical outlet port 334 connects a FDM electronic unit 335 to a vehicle system controller (not shown, similar to controller 112 of FIG. 1) for communication of fuel level and fuel tank vapor pressure.

A refueling system 319 (similar to refueling system 119 of FIG. 1) is directly coupled to fuel tank 320 via upper wall 394. Refueling system 319 may contain system components including a fuel cap (not shown), refueling lock 345, and fuel filler pipe 311. A fuel tank structural support 397 can be found adjacent to FDM 393 within an interior of fuel tank 320, attached to fuel tank 320 via top 394 and base 395. Specifically, the fuel tank structural support 397 may include one or more supports that extend between the top 394 and base 395 of the fuel tank 320. In some examples, FDM 393 may be located on an opposite side of fuel tank 320 from structural support 397 within fuel tank 320. Baffle(s) 391 may be located behind structural support 397. Baffles 391 are described in further detail below with reference to FIG. 5.

A pivotable float arm 390 of FTPT unit 392 is fixed at a second end within FDM 393 and coupled at a first end to floating body 386. Further information describing how the pivotable float arm of FTPT unit 392 is fixed within FDM 393 can be found below with reference to FIG. 4. FIG. 3A shows an exploded view of FTPT unit 392. FTPT unit 392 contains the float arm 390, a fuel tank pressure transducer 324 (herein referred to as FTPT 324), and the floating body (e.g., float device) 386. The float arm 390 extends out of an interior of FDM 393. Float arm 390 includes a pivotable base coupled to an end of float arm 390 inside the interior of the FDM 393. The pivotable base (shown in FIG. 4) is a variable resistor electrically connected to the electronic unit 335 of the FDM 393. The pivotable base communicates the level of fuel within the fuel tank 320 based on an angle of the float arm 390 relative to a longitudinal axis arranged vertically (with respect to vertical y-axis, as shown by axes system 300) through a pivot point of the pivotable base. As floating body 386 moves up and down relative to a fuel level (not shown), the float arm 390 moves away from/toward the longitudinal axis and therefore changes the angle of rotation of the pivotable base. As the float arm 390 and pivotable base rotate, a variable resistor card of the pivotable base will change its resistance measurement communicated to the electronic unit 335. The description of FIG. 4 below offers further detail describing how float arm 390 pivots in response to fuel level.

Float arm 390 is at least partially hollow and can house electrical wires 303 within an interior of a body of float arm 390. Electrical wires 303 are routed internally through float arm 390 for connection to the FDM electronic unit 335. Floating body 386 is directly coupled to a first end of float arm 390 to maintain buoyancy above the fuel level. FTPT 324 is electrically connected to the top of floating body 386. FTPT includes a sensing portion positioned at a top surface of the floating body 386 and an electrical connection coupled to the sensing portion and routed—via electrical wires 303—through an interior of the float arm 390. Sensors (not shown) housed within FTPT 324 output a signal corresponding to a vapor pressure inside fuel tank 320. Turning to FIG. 4, internal components of FDM 393 including FTPT unit 392 is shown.

Inside the interior of FDM 393 and located vertically below electronic unit 335 is a pivotable base 401 which includes a pivot point that the pivotable base 401 rotates around. Pivotable base 401 may be positioned within FDM top cap 310 (shown in FIG. 3). As explained above, the pivotable base 401 is an additional component of FTPT unit 392. A second end of float arm 390 is fixed to pivotable base 401 to allow float arm 390 to pivot in response to a changing fuel level (not shown in FIG. 4) within fuel tank 320. The float arm 390 includes a float arm elbow 407 (similar to float arm elbow 194 in FIGS. 1 and 2). Float arm elbow 407 forms a 90 degree bend in the structure of float arm 390.

The float arm 390 can pivot via pivotable base 401 as floating body 386, directly—connected to the first end of float arm 390-, rises and falls responsive to the changing fuel level within fuel tank 320. Electronic unit 335 reads an amount of rotation of pivotable base 401 which corresponds to an angle of float arm 390 relative to a longitudinal axis 405. The degree of the angle changes a resistance output of the pivotable base 401 which is communicated to the electronic unit 335 and then sent to a vehicle system controller (not shown in FIG. 4) to output an estimate of the fuel level within fuel tank 320. FIG. 4 shows a first position 408 of the float arm when the fuel level in the fuel tank 320 is at a lower, first level and a second position 410 of the float arm 390 when the fuel level in the fuel tank 320 is at a higher, second level.

Further, as seen in FIG. 3, FTPT 324 is connected to floating body 386. As stated in FIG. 3, FTPT 324 contains a sensing portion-positioned at a top surface of the floating body 386—responsive to a vapor pressure within fuel tank 320. A signal is output from FTPT 324 sensors to electronic unit 335 via electrical wires 303 (shown in FIG. 3). A fuel pump system 403 (similar to fuel pump system 121 of FIG. 1) is an additional component of FDM 393. Fuel pump system 403 is located in the interior of top cap 310, adjacent to pivotable base 401. Fuel pump system 403 is coupled to fuel outlet 321. The fuel pump system 403 may include one or more pumps for pressurizing fuel delivered through fuel outlet 321 to the fuel injectors of the engine.

Moving on to FIG. 5, a full length view of an interior body of fuel tank 320 is shown. As referenced in FIG. 3, one or more baffles 391 extend along the length of fuel tank 320. During vehicle acceleration/deceleration, such as during an increase in speed of the vehicle or during a braking event of the vehicle, fuel stored in a fuel tank (e.g., fuel tank 320) onboard the vehicle may slosh around within the fuel tank. From this, the fuel may hit corners or walls of the fuel tank creating a slapping or sloshing noise that may be audible inside the vehicle when the engine is not in operation. In addition to an audible noise, the fuel slosh may cause a float arm of a fuel level indicator ("FLI") to oscillate (e.g., bounce around and change position rapidly), potentially resulting in a degraded fuel pressure signal and a fuel level signal of reduced accuracy (due to a rate of change in the position of the float arm above a threshold). A method for responding to such oscillation of a FLI is found in FIG. 6.

As such, one or more baffles (i.e., baffles 391) may be placed in the fuel tank 320 to help reduce fuel sloshing (and turbulent conditions within fuel tank 320). The baffles 391 are arranged along a single plane of fuel tank 320, approximately parallel relative to x-axis 300. Baffles 391 extend from a first end 501 to a second end 503 of baffles 391. First end 501 tapers in a direction negative to the x-axis to conform to the shape of tank 320. Baffles 391 adhere to the top 394 and base 395 of tank 320 at points 505. However, the baffles may be arranged differently in other examples. The baffles 391 include a plurality of cut-outs (e.g., cut-out 507). The cut-outs further assist in the reduction of fuel displacement in fuel tank 320.

FIGS. 3-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 6, a flowchart for an example method 600 for controlling a vehicle engine based on outputs of an integrated fuel level and pressure sensor inside of a fuel tank is shown. More specifically, method 600 may present a method for, responsive to a filtered signal output from an integrated FTPT unit (such as FTPT unit 192 shown in FIGS. 1-2 or FTPT unit 392 shown in FIGS. 3-4), initiating a leak detection test, identifying if the fuel door can be opened, determining if additional fuel can be added to the fuel tank, and indicating a fuel level and fuel tank pressure to a vehicle operator. Method 600 will be described with reference to the systems described herein and shown in FIGS. 1-5, though it should be understood that similar methods may be applied to other systems without departing from the scope of this disclosure. Instructions for carrying out method 600 and the rest of the methods included herein may be executed by a controller (such as controller 112 shown in FIG. 1) based on instructions stored on a memory of the controller and in conjunction with signals received from sensors of the engine system, such as the sensors described above with reference to FIGS. 1-4. The controller may employ engine actuators of the engine system to adjust engine operation, according to the methods described below.

Method 600 begins at 605 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 610, method 600 includes determining whether a refueling event has been requested. For example, a refueling request may be requested in response to a vehicle operator depressing a refueling button on a vehicle instrument panel in the vehicle or at a refueling door. In some examples, a refueling request may comprise an operator requesting access to a fuel filler neck, for example, by attempting to open a refueling door, and/or attempting to remove a gas cap. If at 610, a refueling event has been requested, method 600 proceeds to 615. At 615, refueling the vehicle may proceed as described by the method detailed in FIG. 7. Method 600 may then end.

If at 610, vehicle refueling has not been requested, method 600 continues to 620. At 620, method 600 includes indicating whether the change in vehicle speed is within a threshold range. The threshold range may include the vehicle speed being relatively constant such that it is not increasing or decreasing by more than a threshold rate of change. In some examples, a change in vehicle speed outside of a threshold range may be caused by acceleration, deceleration, braking, etc. Further detail regarding FTPT unit output based on vehicle speed may be found in FIG. 10. If at 620, a change in vehicle speed is not within a threshold range, this indicates the vehicle may be experiencing unsteady conditions which may cause the float arm to oscillate or "bounce" or may cause a pressure sensor output having increased noise. If this occurs, method 600 proceeds to 625 to not use the fuel level indication (FLI) from the fuel level sensor of the FTPT unit and not use the FTPT output of the FTPT of the FTPT unit. Instead, the controller may use a previous fuel level and pressure estimate from the FTPT unit to adjust engine operation. Thus, the method at 625 includes not adjusting engine operation based on current fuel level and pressure outputs of the FTPT unit. Method 600 may then end.

If at 620, the change in vehicle speed is within the threshold range, method 600 proceeds to 630 to obtain FTPT unit outputs. The FTPT unit outputs include an indication of fuel tank fuel level as well as vapor pressure inside the fuel tank. The outputs may be received by a vehicle system controller via an electrical connection coupled to an electronic unit of a fuel delivery module including the FTPT unit. For example, an electrical connection of the pressure sensor may be routed through an interior of the FTPT unit float arm (as shown in FIGS. 3-4) to the electronic unit and the electrical connection of the fuel level sensor may be coupled between a pivotable base coupled to the float arm and the electronic unit. Method 600 then proceeds to 635 to filter the signal of the FTPT unit outputs based on one another. Filtering of signals allows use of one output to adjust or diagnose the other. As one example, filtering the fuel level output (e.g., FLI output) includes, if the FLI output of the FTPT unit is changing less than a threshold amount and reading a fuel level over a threshold level (e.g., the rate of change in the fuel level output is less than the threshold amount or level and the fuel level output indicates a fuel level over a threshold level, such as a full tank level), using the FTPT to validate a stuck FLI condition (e.g., the float of the FTPT unit stuck at a top of the fuel tank). The threshold amount may be a threshold number of oscillations of the FLI output over a threshold duration. In another example, the threshold amount may be a threshold number of changes in the FLI output above and below an average value, over a threshold duration, such that when the number of changes received by the controller is less than this range it may indicate a stuck FLI. In one example, the stuck FLI condition may be validated by performing a fuel tank evacuation using engine vacuum. The emissions control system may be sealed (via closing the CVS) and the CPV is then duty cycled to evacuate the system to a nominal target vacuum. The FTPT may then be used to determine when the target vacuum is achieved. An evacuation time (e.g., a time from sealing the emissions control system to achieving the target vacuum) less than a threshold duration may be indicative of a full fuel tank. An evacuation time greater than the threshold duration may be indicative of a fuel tank level below the full fuel tank level. Thus, the threshold duration may be an expected amount of time to achieve pressure when the fuel tank is full. Upon performing the fuel tank evacuation, if the evacuation time is greater than the threshold duration, the controller may determine that the FLI is stuck in a position at the top of the fuel tank. In response to this determination, the FLI output may not be used and a previous FLI output may be used, or a different estimate of the fuel level, not based on the FLI output, may be used for engine control.

In another example, filtering the FTPT output includes, if the FLI output of the FTPT unit is changing by greater than a threshold amount (e.g., the rate of change in the fuel level output is greater than the threshold amount or level), not using the FTPT output to estimate a current fuel tank pressure. Instead, the controller may use a previous FTPT output of the FTPT unit (when the FLI output was not changing by greater than the threshold amount) to estimate the fuel tank pressure and adjust engine operation. The threshold amount may be a threshold number of oscillations of the FLI output over a threshold duration. In another example, the threshold amount may be a threshold number of changes in the FLI output above and below an average value, over a threshold duration, which indicates the float arm is bouncing or changing positions within the fuel tank at a faster rate than a fuel level may be changing. For example, if there are bumps or turns in the road, or under fast acceleration or deceleration conditions, fuel within the fuel tank may slosh around, causing the float arm to bounce around and change position rapidly, thereby degrading the output of the FTPT and FLI. As another example, filtering the FLI output may include, if the FTPT output is outside a threshold range, not using the FLI output to estimate a current fuel level of the fuel tank. Instead, the controller may use a previous FLI output of the FTPT unit (when the FTPT output was within the threshold range) to estimate the fuel tank fuel level and adjust engine operation. The threshold range may be a range of measurable pressure of the FTPT such that when a pressure reads outside of this range it may indicate degradation of the FTPT and/or floating body of the FTPT unit.

Continuing to 640, the fuel level and fuel pressure are determined based on the filtered FTPT and FLI outputs. At 645, the method includes adjusting engine operation based on the determined fuel level and fuel pressure. Adjusting engine operation based on the determined fuel level and fuel pressure of the fuel tank may include one or more of initiating a leak detection test of the fuel system, identifying if the fuel door can be opened, determining if additional fuel can be added to the fuel tank, and indicating a fuel level and/or fuel tank pressure to a vehicle operator (e.g., via a visual indicator or audible signal). Method 600 may then end.

Turning to FIG. 7, a flowchart for an example method 700 for refueling a vehicle based on a request from the engine operator and outputs of an integrated fuel level and pressure sensor of a fuel tank (such as FTPT unit 192 in FIGS. 1-2 and FTPT unit 392 in FIGS. 3-4) is shown. Method 700 may continue from method 600, as explained above.

At 705, the method may include determining whether a refueling request has been received. At 710, if the method determines a refueling request has been received, the engine may be turned off to proceed with the refueling event. At 715, purging operations may be disabled, for example, by (temporarily) maintaining the CPV in a closed position. The refueling request can then proceed. In the case of plug-in hybrid electric vehicles (PHEV), the steps following a refueling request may include depressurizing the fuel tank. The internal combustion engine of a PHEV may not operate for a prolonged period of time. In such systems, the fuel tank may be sealed and at a relatively high pressure. An automatic lock of the fuel cap is provided. Before refueling, the operator presses a dashboard button and, in response, the fuel tank is vented through the carbon canister to reduce fuel tank pressure. When a fuel tank pressure sensor indicates that the fuel tank pressure has fallen to a predetermined level, the fuel cap unlocked.

At 720, the FTIV (e.g., valve 152 in FIG. 1) may be opened and the CVV may be maintained open to vent the fuel tank. Herein, by opening the vapor line between the fuel tank side and the canister side of the fuel vapor circuit, pressure in the fuel tank may be relieved. For example, if a high pressure exists in the fuel tank, air and fuel vapors may flow from the fuel tank through the vapor line and into the canister. In another example, if a vacuum exists in the fuel tank, air may flow from the canister through the vapor line and into the fuel tank. In both examples, pressures of the fuel tank and the canister may go toward equilibrium, such that the fuel tank may be opened. At 725, it may be determined whether the absolute value of the fuel tank pressure is below a predetermined threshold pressure. The threshold pressure may be a threshold pressure at which the refueling door may be opened without fuel exiting the vehicle via the fuel door. If the absolute value of the fuel tank pressure is below the threshold pressure, the method continues to 735 where refueling may be enabled. If the absolute value of the fuel tank pressure is greater than the threshold pressure, the controller may delay opening of the refueling door at 730, until the fuel tank pressure falls below the threshold pressure. In one example at 735, the controller may enable refueling by commanding a refueling door to open, for example, by de-energizing a solenoid in the refueling door to enable door opening.

Continuing to 740, method 700 includes monitoring fuel pressure and fuel level during refueling of the vehicle. Monitoring fuel pressure and fuel level may include the control system (e.g., controller) receiving information regarding the vapor pressure and level of fuel stored in the fuel tank via an integrated FTPT unit (such as FTPT unit 192 in FIGS. 1-2 or FTPT unit 392 in FIGS. 3-4), either continuously or at predetermined intervals over the duration of the refueling event. As discussed above with reference to FIGS. 3-6, the FTPT unit may comprise a fuel level float arm attached to a float containing a fuel tank pressure transducer electrically connected to an electronic unit of a fuel delivery module within the fuel tank. The fuel level float arm further includes a pivotable base inside the fuel delivery module, where the pivotable base comprises a variable resistor electrically coupled to the electronic unit. The electronic unit of the fuel delivery module may then send signals to the engine controller wherefrom the controller may determine the vapor pressure and level of fuel stored in the fuel tank.

The vehicle operator may then have access to the refueling line and fuel may be pumped from an external source into the fuel tank until refueling is determined to be complete at 745. Because the FTIV may remain open during the refueling operation, refueling vapors may flow through the vapor line and into the carbon canister for storage. Until refueling is complete, refueling operations may be maintained at 750. If refueling is determined to be complete at 745, for example based on outputs from the integrated FTPT unit, the refueling door may be closed at 755, for example by energizing the refueling door solenoid. For example, in response to the fuel vapor pressure output from the FTPT increasing above a set threshold, the controller may determine that refueling is complete and proceed to close the refueling door. As such, the integrated FTPT unit may allow a faster response time due to its location within the fuel tank, thereby reducing transport delay. Further detail regarding the response time of a FTPT to a pressure spike can be found below in the description of FIG. 8.

In response to refueling door closing, at 760, the FTIV and CVV may be closed, thereby ensuring that refueling vapors are stored in the canister side of the fuel vapor circuit. Upon completion of 760, method 700 proceeds to determine the fuel added and the fuel pressure based on the received outputs from the FTPT unit. At 770, the level of fuel remaining and fuel pressure in the tank is indicated to the operator via the vehicle system controller. Therein, the refueling routine may be concluded. In this way, refueling may be enabled when fuel tank pressures are within a set range.

Figure 8:
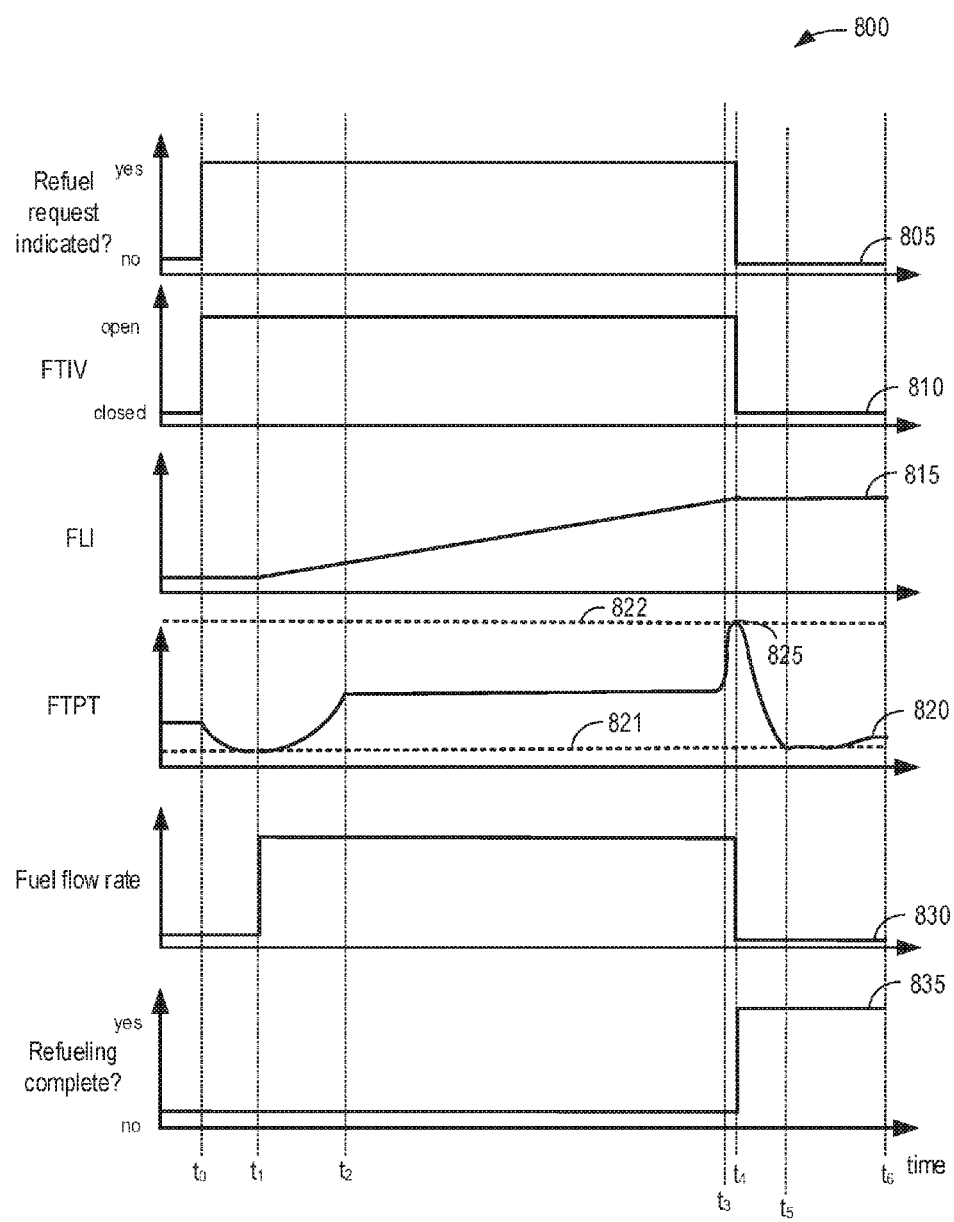
FIG. 8 shows an example graph showing changes in engine operating parameters during a refueling event.

FIG. 8 shows a graphical example of a refueling event using methods described herein (such as method 700 of FIG. 7) and as applied to the systems described herein (such as the systems of FIGS. 1-5). Specifically, graph 800 indicates whether a refuel request is indicated by a vehicle operator at plot 805, the position a fuel isolation valve at plot 810, a fuel level indicator output indicating a fuel level in a fuel tank at plot 815 (as indicated from an output of a FTPT unit including an integrated fuel level and fuel pressure sensor), a fuel tank pressure transducer output indicating a fuel tank pressure (as indicated from an output of the FTPT unit) at plot 820, a fuel flow rate during a refueling event at plot 830, and whether a refueling event is indicated as being complete at plot 835. Line 821 represents atmospheric pressure inside of a fuel tank. Line 822 represents a fuel tank threshold pressure. The threshold pressure may be an upper threshold pressure that indicates a fuel tank is full (e.g., at a volumetric capacity for the tank) and thus a refueling event may be terminated.

At a time $t_0$, a refueling request by a vehicle operator is indicated (plot 805). In response to the refueling request, a fuel tank isolation valve may be commanded open at time $t_0$ (plot 810). By commanding open the FTIV (while maintaining open or commanding open a canister vent valve), the fuel tank may be depressurized prior to commencing refueling. As refueling has not yet been initiated, fuel is not indicated to be flowing from a refueling dispenser (plot 830), and refueling is not complete (plot 835). Between times $t_0$ and $t_1$, the FTIV is open and the fuel tank is depressurized, as indicated by the FTPT unit at plot 820.

At time $t_1$, responsive to pressure in the fuel tank reaching atmospheric pressure, as indicated by line 821, refueling of the vehicle commences (plot 830). As such, between times $t_1$ and $t_2$, pressure in the fuel tank rises, and the level of fuel in the fuel tank increases (plot 815). Between time $t_2$ and time $t_3$, pressure in the fuel tank remains relatively constant, as a result of the constant fuel flow rate from the refueling dispenser, and the level of fuel in the fuel tank continues to rise.

Between times $t_3$ and $t_4$, fuel level in the fuel tank begins to reach an upper level, which may be a maximum capacity of the tank (plot 815) Arriving at the full fill level causes the fuel tank pressure to sharply increase. Accordingly, at time $t_4$, there is a peak in pressure (plot 820), represented by a point 825.

Thus, at time $t_4$, in response to the pressure spike output by the FTPT, it is indicated that the refueling event is complete (plot 835). For example, an indication that refueling is complete may comprise a subsequent closure of the FTIV (plot 810), a removal of a refueling nozzle from the fuel filler, a replacement of a fuel cap, or a closure of a refueling door, etc. Between times $t_4$ and $t_5$, the pressure in the fuel tank decreases to atmospheric pressure (plot 820). As such, at time $t_5$, the FTIV remains closed to seal the fuel tank (plot 810), and the refuel request selection may be reset (plot 805), as the refueling event has ended. Between time $t_5$ and $t_6$, as the refueling valve is closed thus sealing the fuel tank, pressure in the tank is observed to build slightly (plot 820) due to the warm fuel temperature resulting from the recent refueling event.

Figure 9:
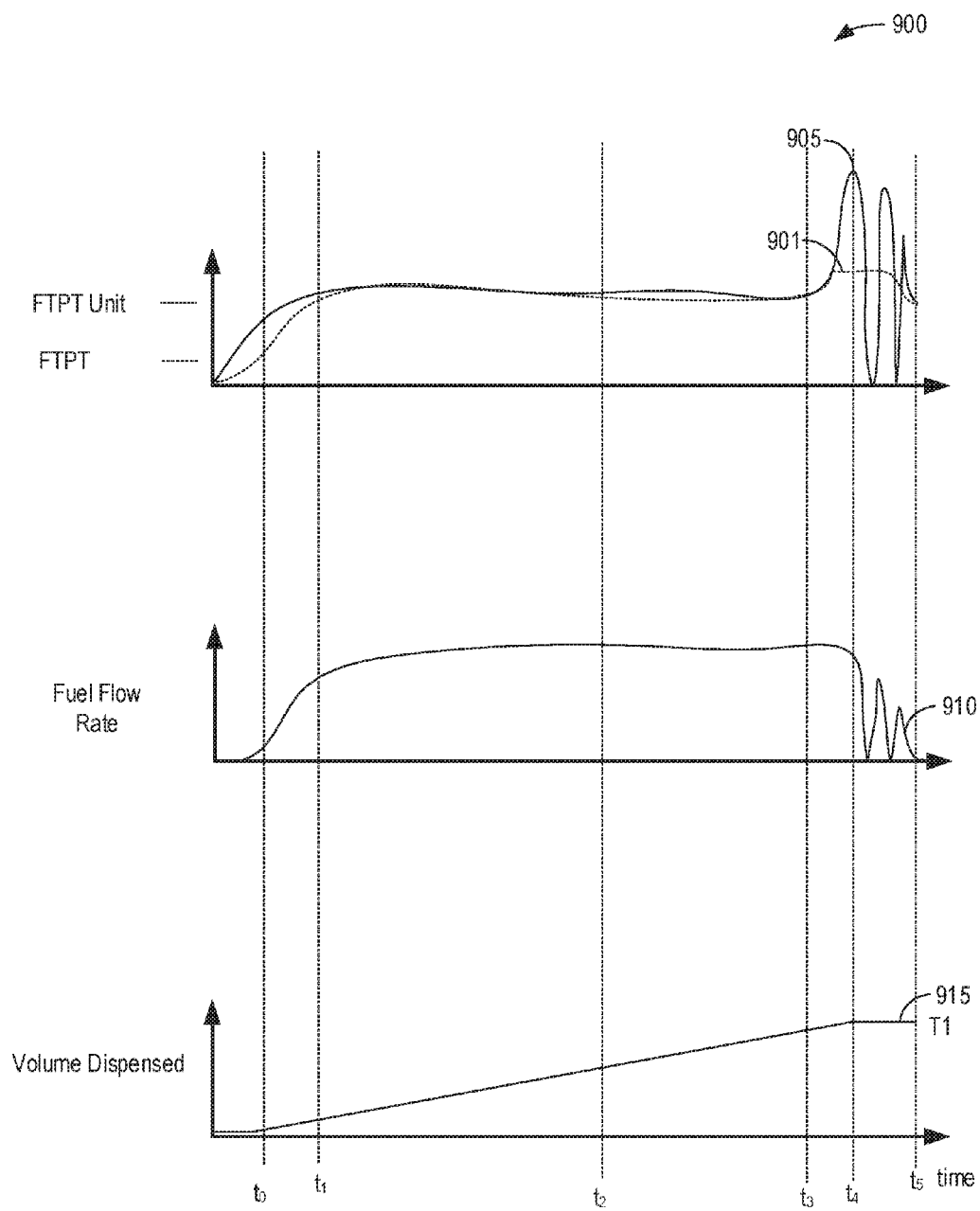
FIG. 9 shows an example graph showing changes in an output of a fuel tank pressure transducer over time during a refueling event.

FIG. 9 shows a graphical example of the response of a fuel tank pressure transducer over time based on the volume of fuel dispensed into a fuel tank during a refueling event. Specifically, graph 900 shows changes in the output of a traditional FTPT —arranged in-line with a passage external to a fuel tank—at plot 901, changes in an output of a FTPT unit—arranged internally within a fuel tank (such as the FTPT units described herein)—at plot 905, changes in fuel flow rate during a refueling operation at plot 910, and the volume of fuel dispensed in a fuel tank at plot 915. Fuel systems often utilize a FTPT positioned outside of a fuel tank. In this way, a comparison of response time to pressure changes is drawn between a traditional FTPT positioned outside of a fuel tank and a FTPT unit positioned inside of a fuel tank. The FTPT at plot 901 is an example embodiment of a FTPT located downstream of a fuel tank. The FTPT unit at plot 905 contains an integrated FTPT sensor located on a floating body of a fuel level indicator inside of the fuel tank.

Prior to time $t_0$, a desired refueling amount is selected by a vehicle operator (not shown). As a desired refueling amount has been selected by the vehicle operator, a fuel tank isolation valve (FTIV) may be commanded open (not shown in FIG. 9). By commanding open the FTIV (while maintaining open or commanding open a canister vent valve), the fuel tank may be depressurized prior to commencing refueling.

As a result of the FTIV opening while the canister vent valve is open, a small increase in pressure occurs due to an initial release of pressure inside the fuel tank, as seen in the response of both fuel tank pressure transducers at plots 901 and 905. For the FTPT located outside of the fuel tank (plot 901), the vapor pressure exits through the FTIV and flows down a conduit leading to the FTPT. The pressure response of the FTPT is slightly delayed (plot 901) due to its location downstream of the FTIV. A delay in response to pressure changes may lead to decreased engine control. In the case of a mechanical error within the fuel tank, such as the FTIV not opening properly, the FTPT may not be able to respond quickly enough to indicate the change in pressure. With the FTIV closed or malfunctioning, substantial pressure may build inside of the fuel tank prior to a refueling event. Left unobserved by the FTPT, the customer may unlock the fuel cap for refueling and experience a blowback of fuel and/or fuel vapors. Blowback occurs in response to a high pressure build-up in the fuel tank, resulting in the reverse flow of gas through the fuel filler pipe. In direct comparison, the initial release of pressure inside the fuel tank reaches the FTPT unit (plot 905) before exiting the tank via the FTIV. As a result, there is a more immediate response from the FTPT unit (plot 905), as indicated by a more rapid rise in pressure at time to.

Between times $t_0$ to $t_1$, refueling of the vehicle commences (plot 910). As such, between times $t_0$ and $t_1$ pressure in the fuel tank rises, and the level of fuel in the fuel tank increases (plot 915). Between times $t_1$ and $t_2$ pressure in the fuel tank remains relatively constant as a result of the relatively constant fuel flow rate from the refueling dispenser, and the level of fuel in the fuel tank continues to rise. Between times $t_2$ and $t_3$, pressure in the fuel tank remains relatively constant, as a result of the constant fuel flow rate from the refueling dispenser, and the level of fuel in the fuel tank continues to rise. Between times $t_3$ and $t_4$, the pressure begins to build in the tank, as indicated by plot 901 and plot 905, while the volume of fuel dispensed (plot 915) continues to ascend toward a threshold T1 (plot 915).

Between time $t_3$ and time $t_4$ the tank level approaches threshold T1 (plot 915) and a sharp peak in fuel tank vapor pressure occurs at time $t_4$ (as shown by output of the FTPT unit at plot 905). As shown in plot 901, the FTPT has a weak pressure response to the tank reaching threshold T1 of a maximum volume of fuel dispensed. Similar to mechanical issues stated prior, in the case of a FTPT error (e.g., corked, experiencing condensation or stall) due to its location outside of the fuel tank, the vehicle system controller cannot alternatively rely on a pressure response as an indication to end of refueling. In a case of blowback post-refueling, the customer is not aware the fuel tank has reached a threshold and continues to flow gas through the filler pipe. This can result in the reverse flow of gas through the filler pipe. By direct comparison, the FTPT unit shows a clear response to the pressure spike. As a result, the vehicle system control is fully aware that the tank is full and the refueling event has ended. Between times $t_4$ and $t_5$, fuel flow undulates as it descends towards a rate of zero flow (plot 910) and the volume of fuel dispensed (plot 915) has reached threshold T1. The FTPT unit will also undulate as it returns to a steady output (plot 901). The FTPT continues to register a mild change in pressure as it returns to a steady output (plot 905).

At time $t_5$, refueling is complete. The fuel flow rate (plot 910) has stopped flowing and the volume dispensed (plot 915) is at threshold T1. The pressure in the tank returns to a steady state as indicated by FTPT (plot 901) and FTPT unit (plot 905).

FIG. 10 shows a graphical example of a relationship between a fuel level indicator output and a fuel tank pressure sensor output (of an integrated fuel level and fuel pressure unit, such as an FTPT unit) when the vehicle speed changes over time, using methods described herein with respect to FIG. 6 and as applied to the systems described herein with reference to FIGS. 1-4. The FTPT and FLI outputs may be from the integrated FTPT unit. Specifically, graph 1000 shows a change in vehicle speed at plot 1005, the output of a FLI (e.g., float arm 190 and floating body 186 of FIG. 1) in response to a change in vehicle speed at plot 1010, the output of a FTPT (e.g., FTPT 124 of FIG. 1), and whether the FLI/FTPT outputs are obtained by an engine controller and used for adjusting engine operation at plot 1020. The change in vehicle speed (plot 1005) may be based on a change in pedal position of an accelerator pedal, in one example.

At time $t_0$, the vehicle speed is relatively constant (plot 1005). This implies the change in speed of the vehicle is within a threshold range. The outputs of FLI (plot 1010) and FTPT (1015) are also relatively constant. This implies that the FLI and FTPT, as an integrated unit, are relatively stable in response to a vehicle speed within a threshold range. As a result, the controller may obtain the outputs from the integrated FTPT unit (plot 1020) and use the outputs to determine fuel level and fuel tank pressure for adjusting engine operation.

Further in graph 1000, between time $t_0$ and $t_1$, the vehicle begins to accelerate and the speed begins to change (plot 1005). As the vehicle speed changes, the FLI (plot 1010) and FTPT (1015) begin to oscillate or "bounce" in response. When the FLI/FTPT is oscillating, this may result in outputs with increased noise. For example, as the fuel level sensor (comprising the floating body and float arm) oscillates up and down with the sloshing fuel within the fuel tank, the output from the FTPT may become degraded and result in less accurate engine control based on the output. Thus, due to this oscillation in the fuel level output (FLI), the controller disregards the FTPT and FLI outputs and may instead adjust engine operation based on previously determined fuel level and fuel tank pressure values (plot 1020).

From times $t_1$ to $t_2$, the vehicle continues to accelerate (plot 1005). The FLI (plot 1010) and FTPT (1015) continue to oscillate indicating the outputs may be disregarded (plot 1020). Instead, engine operation may be adjusted based on previously determined fuel level and fuel tank pressure values. From times $t_2$ to $t_3$, the vehicle speed returns a steady state (plot 1005). The outputs from both FLI (plot 1010) and FTPT (plot 1015) return to a steady state as well. At this time, controller may obtain the FLI/FTPT outputs and adjust engine operation based on the obtained outputs (plot 1020).

From times $t_3$ to $t_4$, the vehicle decelerates and accelerates (plot 1005). The vehicle experiences another change in speed causing a fluctuation in plot 1005. Again, the change in speed results in an oscillation of FLI (plot 1010) and thus FTPT (plot 1015). At this time, the FLI/FTPT outputs are not obtained by the controller (plot 1020).

Graph 1000 continues from times $t_4$ to $t_5$. The vehicle speed returns to a steady state (plot 1005). The FLI (1010) and FTPT (1015) outputs return to a steady state. The return to steady state results in the controlling using the output from the FLI/FTPT for controlling the engine (plot 1020).

In this way, an integrated fuel tank pressure sensor and fuel level sensor may be included as a combined unit within a fuel tank. The integrated pressure sensor and level sensor may be coupled to and within a fuel delivery module of the fuel tank via a float arm of the level sensors. Further, electrical wires coupled to the pressure sensor may be routed through an interior of the float arm and to an electronic module of the fuel delivery module, where the fuel delivery module is in the electronic controller of the engine. Further, the float arm may be coupled to a pivotable base comprising a variable resistor in electronic communication with the electronic unit. As a result, the electronic unit may receive both outputs of the pressure sensor and fuel level sensor and communicate these outputs to the engine controller for adjusting engine operation based on the received outputs. Further, the fuel level and fuel tank pressure outputs may be filtered (e.g., adjusted) based on one another, thereby resulting in more accurate estimates of the fuel level and fuel pressure within the fuel tank and resulting in more accurate engine control.

Positioning of the pressure sensor (e.g., FTPT) on the floating body of the level sensor within the fuel tank may address the issues of a more conventional pressure sensor positioned external to the fuel tank and downstream of the fuel tank in an evaporative emissions and fuel system. With the pressure sensor mounted inside the fuel tank on the floating body of the level sensor, an increased signal to noise ratio output of the pressure sensor may be achieved, thereby increasing an accuracy of engine control based on the output of the pressure sensor. In addition, the pressure sensor may not be exposed to external conditions such as dirt or underbody rust within the fuel tank, thereby enhancing the integrity of the pressure reading and reducing degradation of the pressure sensor. Further, the integration of the pressure sensor with the fuel level sensor reduces packaging requirements typically used to package the sensors independently. Further still, the pressure sensor electrical connections may be simplified by utilizing a common electrical connection with the fuel sensor (e.g., the electronic unit), the electronic unit relaying outputs from the fuel delivery module to the engine controller. The pressure sensor mounting to the floating body and internal routing of the electrical wires may also eliminate vapor permeation through any connection tubes previously used for the positioning of an in-line pressure sensor, downstream of the fuel tank. Finally, a pressure sensor positioned internal to the fuel tank may increase the efficiency and speed of the pressure sensor response time (e.g., due to reduced transport delay) of vapor pressure changes within a fuel tank. This increased response time may prove especially advantageous in a refueling event when the engine controller relies on a peak in vapor pressure within the fuel tank to indicate the end of refueling. As such, the technical effect of a system including a level sensor positioned inside the fuel tank and including a float arm and a floating body coupled to a first end of the float arm, and a pressure sensor integrated with the floating body is increasing an accuracy of the outputs of the pressure and level sensors and the engine control based on these outputs, reducing packaging space for the sensors within the tank, and reducing degradation of the pressure sensor.

In one embodiment, a system for a fuel tank includes a level sensor positioned inside the fuel tank and including a float arm and a floating body coupled to a first end of the float arm; and a pressure sensor integrated with the floating body. In a first example of the system for the fuel tank, the system further comprises a fuel delivery module (FDM) positioned within the fuel tank, wherein a second end the float arm is directly coupled to pivotable base positioned within the FDM, and wherein the float arm is pivotable about a rotational axis of the pivotable base. A second example of the system for the fuel tank optionally includes the first example and further includes wherein the FDM includes an electronic unit, wherein the pivotable base is electrically coupled to the electronic unit, and wherein the pressure sensor includes an electrical connection routed through an interior of the float arm and electrically coupled to the electronic unit. A third example of the system for the fuel tank optionally includes one or more or both of the first and second examples, and further includes wherein the pivotable base including a variable resistor card and wherein the electronic unit is adapted to receive a resistance measurement from the variable resistor card of the pivotable base, where the resistance measurement changes as an angle between the float arm and a longitudinal axis through a pivot point of the pivotable base changes. A fourth example of the system for the fuel tank optionally includes one or more or each of the first through third examples, and further includes wherein the FDM includes a fuel pump electrically coupled to the electronic unit. A fifth example of the system for the fuel tank optionally includes one or more or each of the first through fourth examples, and further includes wherein the electronic unit is electrically coupled to an electronic controller of an engine in which the fuel system is installed via an electrical port coupled to a top surface of the FDM, where the top surface of the FDM is positioned at an exterior of the fuel tank. A sixth example of the system for the fuel tank optionally includes one or more or each of the first through fifth examples, and further includes wherein the FDM further comprises a fuel outlet port in the top surface, where the fuel outlet port is fluidly coupled to each of the fuel pump and a fuel passage coupled to a fuel injector of the engine. A seventh example of the system for the fuel tank optionally includes one or more or each of the first through sixth examples, and further includes wherein the pressure sensor includes a sensing port positioned at a top surface of the floating body and an electrical connection coupled to the sensing port and routed through an interior of the float arm, where the floating body is adapted to float on a surface of fuel disposed within the fuel tank. An eighth example of the system for the fuel tank optionally includes one or more or each of the first through seventh examples, and further includes where the pressure sensor is a gauge sensor and wherein the pressure sensor further includes an atmospheric reference port positioned underneath the sensing port of the pressure sensor.

In a second embodiment, a method includes indicating a fuel tank pressure in a fuel tank based on a filtered pressure output of a fuel tank pressure transducer positioned on a float of a fuel level indicator disposed inside the fuel tank, where the filtered pressure output is filtered based on a fuel level output of the fuel level indicator. In a first example of the method, the method further comprises adjusting engine operation based on the indicated fuel tank pressure, wherein adjusting engine operation includes one or more of adjusting refueling of the fuel tank, adjusting a position of one or more valves fluidly coupled to the fuel tank, and adjusting operation of a fuel pump within the fuel tank. A second example of the method optionally includes the first example, and further includes adjusting engine operation based on a previous fuel tank pressure indication and not based on the filtered pressure output in response to a change in vehicle speed being greater than a threshold level. A third example of the method optionally includes one or more or both of the first and second examples, and further includes filtering the fuel level output of the fuel level indicator based on a pressure output of the fuel tank pressure transducer and indicating an amount of fuel in the fuel tank based the filtered fuel level output. A fourth example of the method optionally includes one or more or each of the first through third examples, and further includes adjusting engine operation based on the indicated fuel level output, wherein adjusting engine operation includes one or more of adjusting refueling of the fuel tank and adjusting an output of a fuel level display. A fifth example of the method optionally includes one or more or each of the first through fourth examples, and further includes filtering a received output of the fuel tank pressure transducer to determine the filtered pressure output in response to a rate of change in the fuel level output being greater than a threshold level. A sixth example of the method optionally includes one or more or each of the first through fifth examples, and further includes wherein filtering the output of the fuel tank pressure transducer includes using a previously stored output of the fuel tank pressure transducer and not the received output of the fuel tank pressure transducer to determine the filtered pressure output. A seventh example of the method optionally includes one or more or each of the first through sixth examples, and further includes filling the fuel tank in response to a refueling request and in response to an increase in the filtered pressure output above a threshold pressure level, automatically indicating refueling is complete and closing a refueling door. An eighth example of the method optionally includes one or more or each of the first through seventh examples, and further includes following indicating refueling is complete, indicating an updated fuel level based on the fuel level output of the fuel level indicator.

In a third embodiment, a fuel system for an engine includes a fuel tank; a fuel delivery module (FDM) positioned within the fuel tank, the FDM including: a level sensor including a float arm, the float arm including a first end directly coupled to a floating body positioned external to the FDM within the fuel tank and a second end directly coupled to a pivotable base coupled within the FDM; a pressure sensor integrated within the floating body; a fuel pump; and an electronic unit electrically coupled to and adapted to receive electrical signals from each of the pressure sensor and the pivotable base; and an engine controller in electronic communication with the electronic unit of the FDM and including non-transitory memory with computer readable instructions for: indicating a fuel level in the fuel tank based on an output of the level sensor and indicating a pressure in the fuel tank based on an output of the pressure sensor. In a first example of the fuel system for an engine, the pressure sensor is electrically coupled to the electronic unit via one or more electrical wires routed through an interior cavity of the float arm and wherein the pivotable based includes a variable resistor in electronic communication with the electronic unit.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a fuel tank, comprising:
  a level sensor positioned inside the fuel tank and including a float arm and a floating body coupled to a first end of the float arm; and
  a pressure sensor integrated with the floating body.

2. The system of claim 1, further comprising a fuel delivery module (FDM) positioned within the fuel tank, wherein a second end the float arm is directly coupled to a pivotable base positioned within the FDM, and wherein the float arm is pivotable about a rotational axis of the pivotable base.

3. The system of claim 2, wherein the FDM includes an electronic unit, wherein the pivotable base is electrically coupled to the electronic unit, and wherein the pressure sensor includes an electrical connection routed through an interior of the float arm and electrically coupled to the electronic unit.

4. The system of claim 3, wherein the pivotable base includes a variable resistor card and wherein the electronic unit is adapted to receive a resistance measurement from the variable resistor card of the pivotable base, where the resistance measurement changes as an angle between the float arm and a longitudinal axis through a pivot point of the pivotable base changes.

5. The system of claim 3, wherein the FDM includes a fuel pump electrically coupled to the electronic unit.

6. The system of claim 5, wherein the electronic unit is electrically coupled to an electronic controller of an engine in which the fuel system is installed via an electrical port coupled to a top surface of the FDM, where the top surface of the FDM is positioned at an exterior of the fuel tank.

7. The system of claim 6, wherein the FDM further comprises a fuel outlet port in the top surface, where the fuel outlet port is fluidly coupled to each of the fuel pump and a fuel passage coupled to a fuel injector of the engine.

8. The system of claim 1, wherein the pressure sensor includes a sensing port positioned at a top surface of the floating body and an electrical connection coupled to the sensing port and routed through an interior of the float arm, where the floating body is adapted to float on a surface of fuel disposed within the fuel tank.

9. The system of claim 8, wherein the pressure sensor is a gauge sensor and wherein the pressure sensor further includes an atmospheric reference port positioned underneath the sensing port of the pressure sensor.

10. A method, comprising:
  indicating a fuel tank pressure in a fuel tank based on a filtered pressure output of a fuel tank pressure transducer positioned on a float of a fuel level indicator disposed inside the fuel tank, where the filtered pressure output is filtered based on a fuel level output of the fuel level indicator.

11. The method of claim 10, further comprising adjusting engine operation based on the indicated fuel tank pressure, wherein adjusting engine operation includes one or more of adjusting refueling of the fuel tank, adjusting a position of one or more valves fluidly coupled to the fuel tank, and adjusting operation of a fuel pump within the fuel tank.

12. The method of claim 10, further comprising adjusting engine operation based on a previous fuel tank pressure indication and not based on the filtered pressure output in response to a change in vehicle speed being greater than a threshold level.

13. The method of claim 10, further comprising filtering the fuel level output of the fuel level indicator based on a pressure output of the fuel tank pressure transducer and indicating an amount of fuel in the fuel tank based on the filtered fuel level output.

14. The method of claim 13, further comprising adjusting engine operation based on the indicated fuel level output, wherein adjusting engine operation includes one or more of adjusting refueling of the fuel tank and adjusting an output of a fuel level display.

15. The method of claim 10, further comprising filtering a received output of the fuel tank pressure transducer to determine the filtered pressure output in response to a rate of change in the fuel level output being greater than a threshold level.

16. The method of claim 15, wherein filtering the output of the fuel tank pressure transducer includes using a previously stored output of the fuel tank pressure transducer and not the received output of the fuel tank pressure transducer to determine the filtered pressure output.

17. The method of claim 10, further comprising filling the fuel tank in response to a refueling request and in response to an increase in the filtered pressure output above a threshold pressure level, automatically indicating refueling is complete and closing a refueling door.

18. The method of claim 17, further comprising, following indicating refueling is complete, indicating an updated fuel level based on the fuel level output of the fuel level indicator.

19. A fuel system for an engine, comprising:
a fuel tank;
a fuel delivery module (FDM) positioned within the fuel tank, the FDM including:
a level sensor including a float arm, the float arm including a first end directly coupled to a floating body positioned external to the FDM within the fuel tank and a second end directly coupled to a pivotable base coupled within the FDM;
a pressure sensor integrated within the floating body;
a fuel pump; and
an electronic unit electrically coupled to and adapted to receive electrical signals from each of the pressure sensor and the pivotable base; and
an engine controller in electronic communication with the electronic unit of the FDM and including non-transitory memory with computer readable instructions for: indicating a fuel level in the fuel tank based on an output of the level sensor and indicating a pressure in the fuel tank based on an output of the pressure sensor.

20. The system of claim 19, wherein the pressure sensor is electrically coupled to the electronic unit via one or more electrical wires routed through an interior cavity of the float arm and wherein the pivotable base includes a variable resistor in electronic communication with the electronic unit.

* * * * *